W. C. WEBSTER.
AIR BRAKE SYSTEM.
APPLICATION FILED MAY 28, 1914.
1,256,406.
Patented Feb. 12, 1918.
12 SHEETS—SHEET 4.
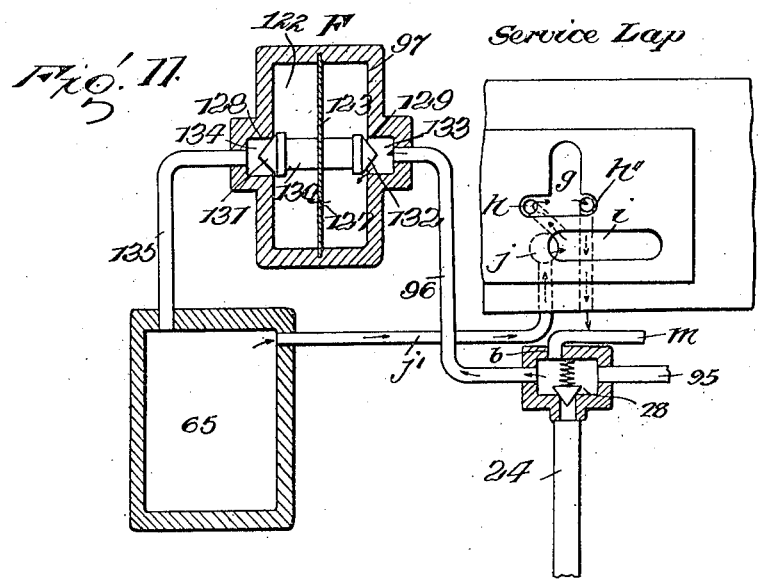
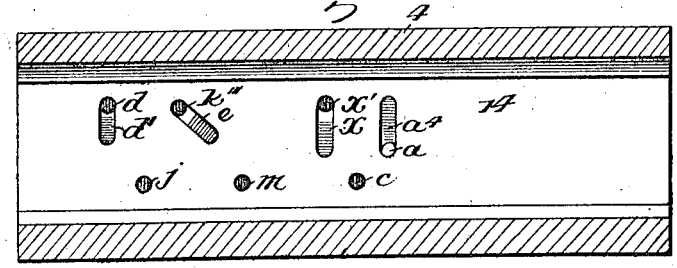
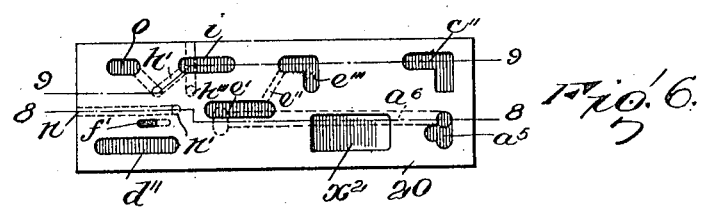
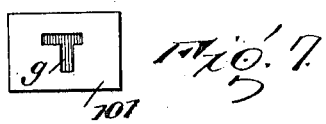
Witnesses
Inventor
W. C. Webster
By
Attorney

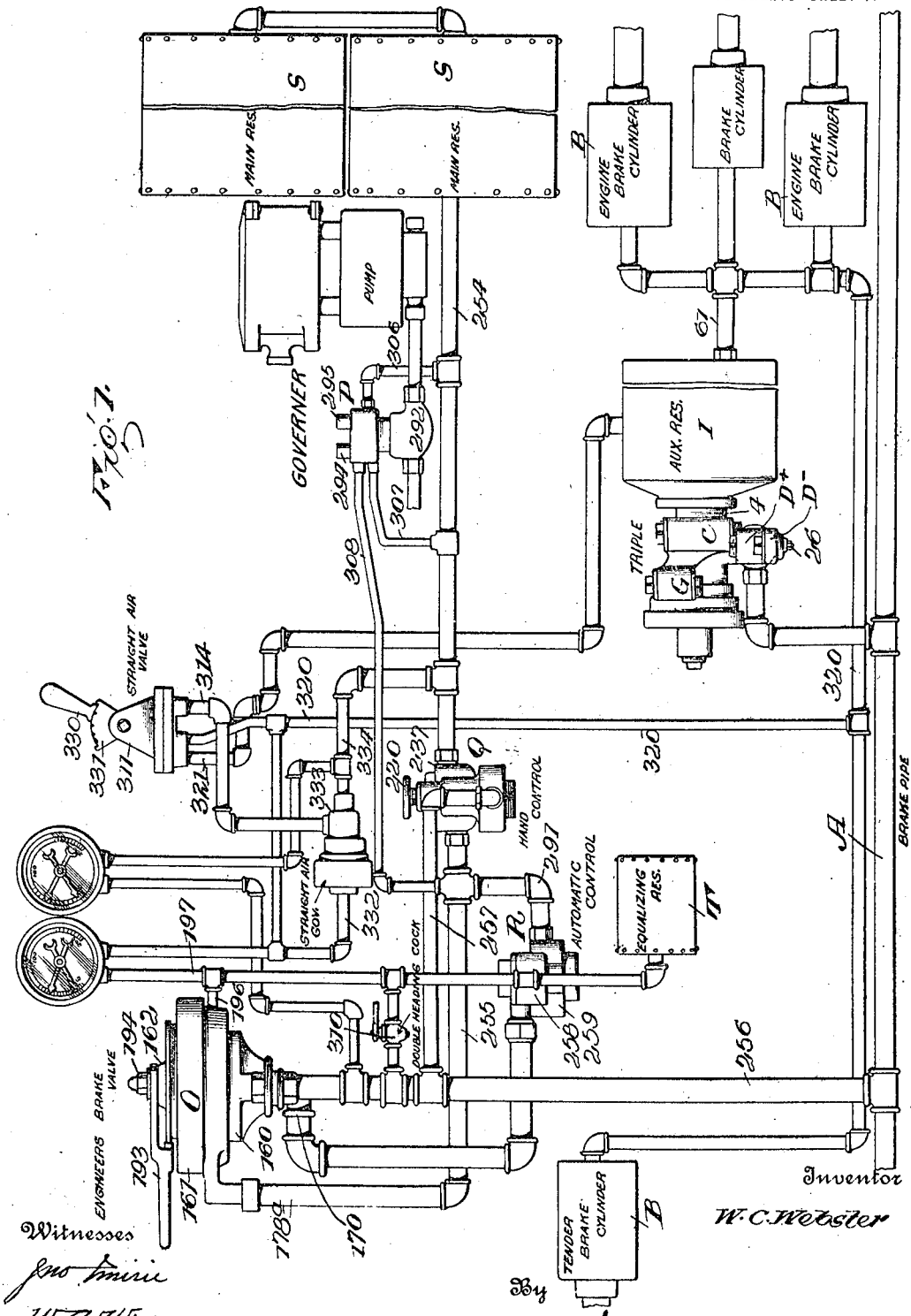

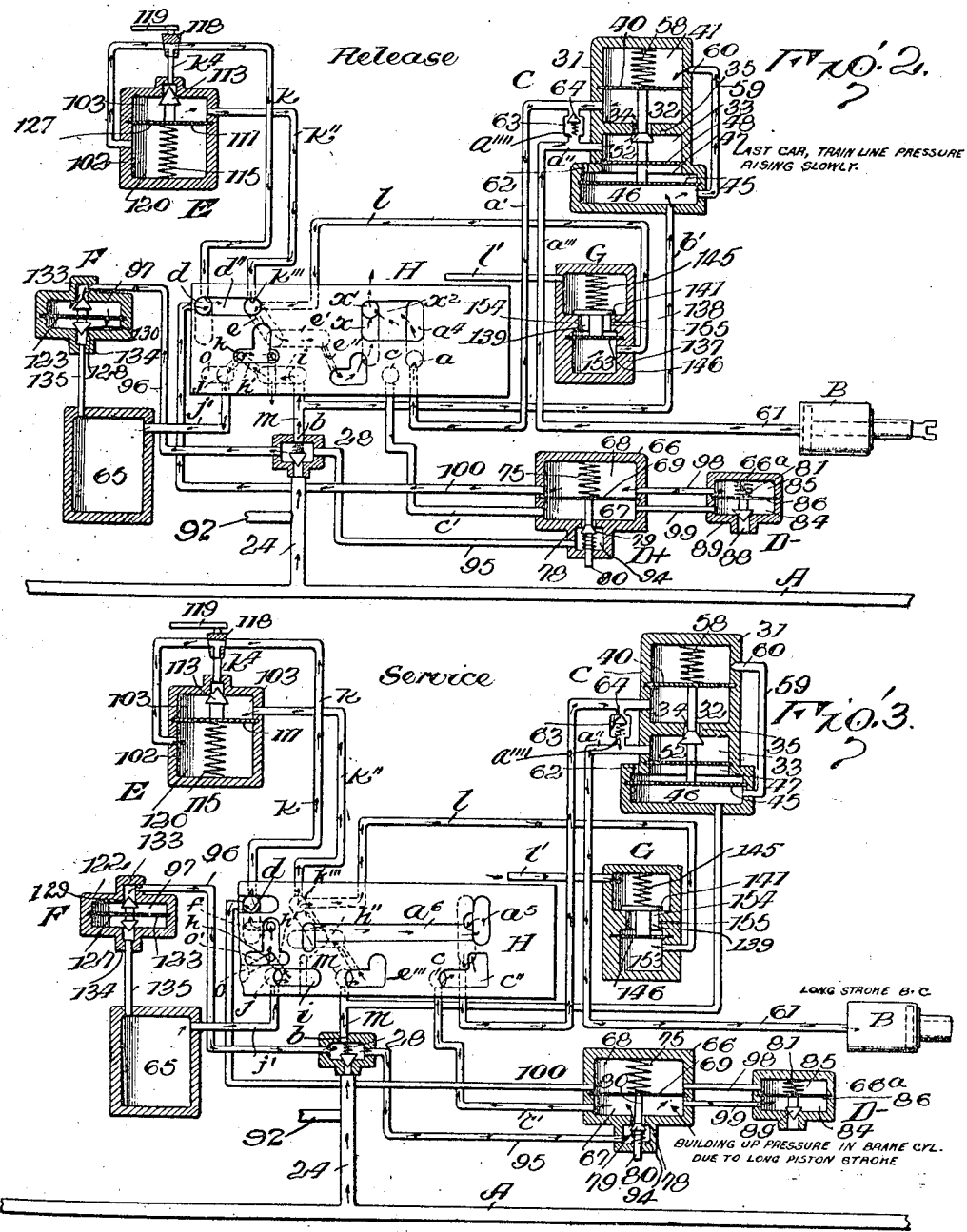

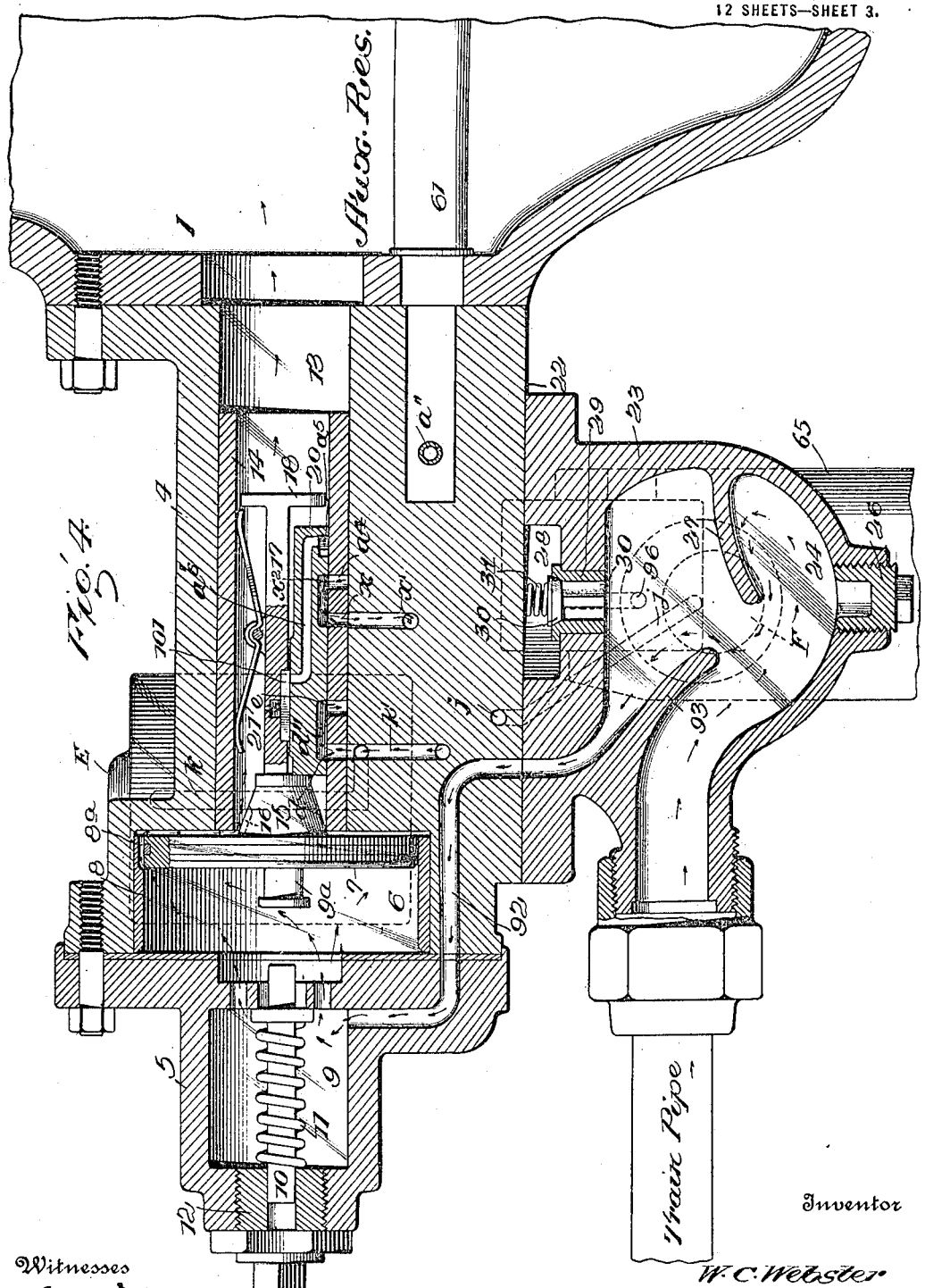

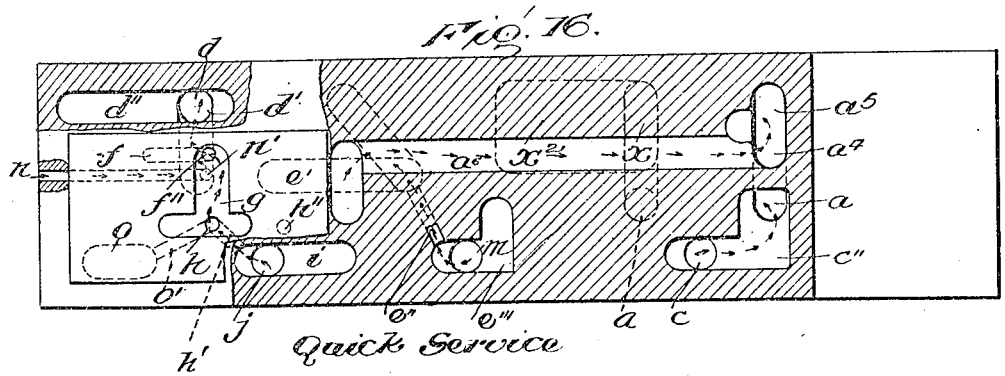

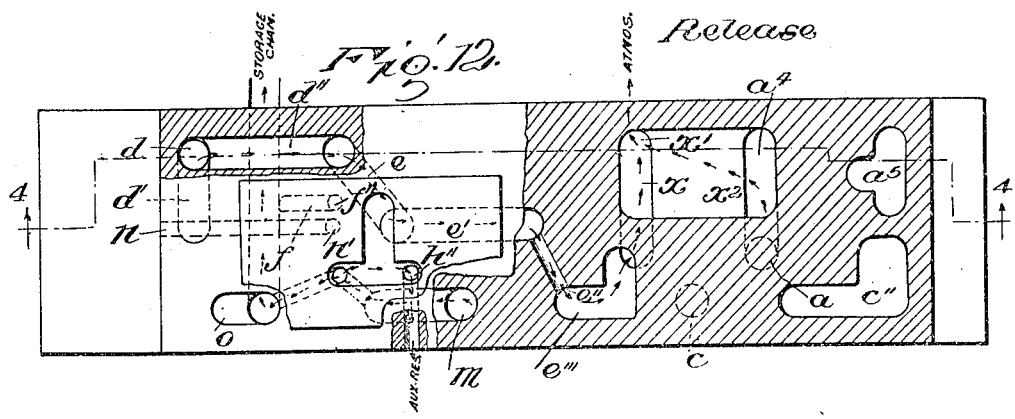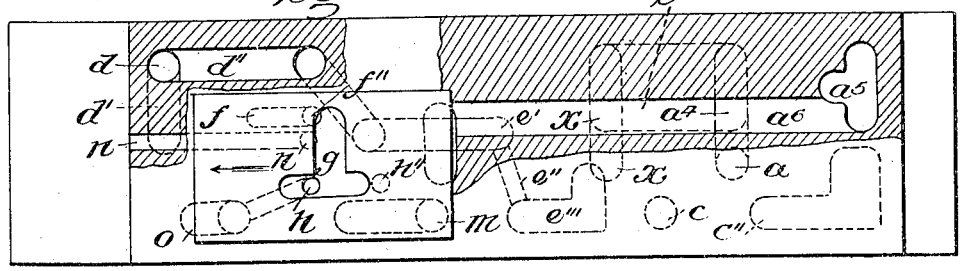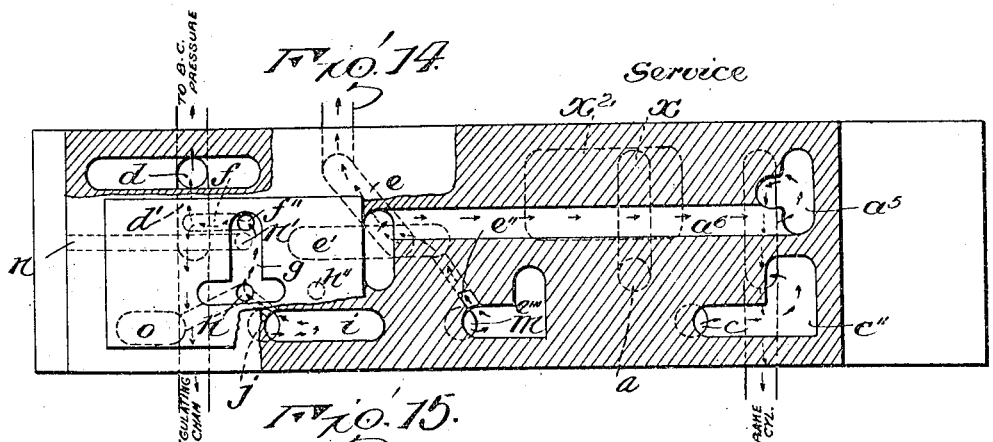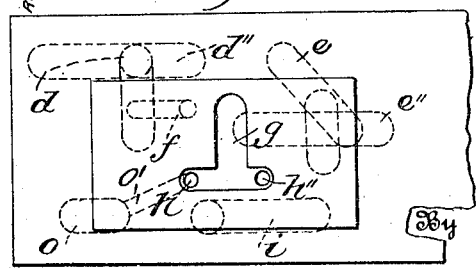

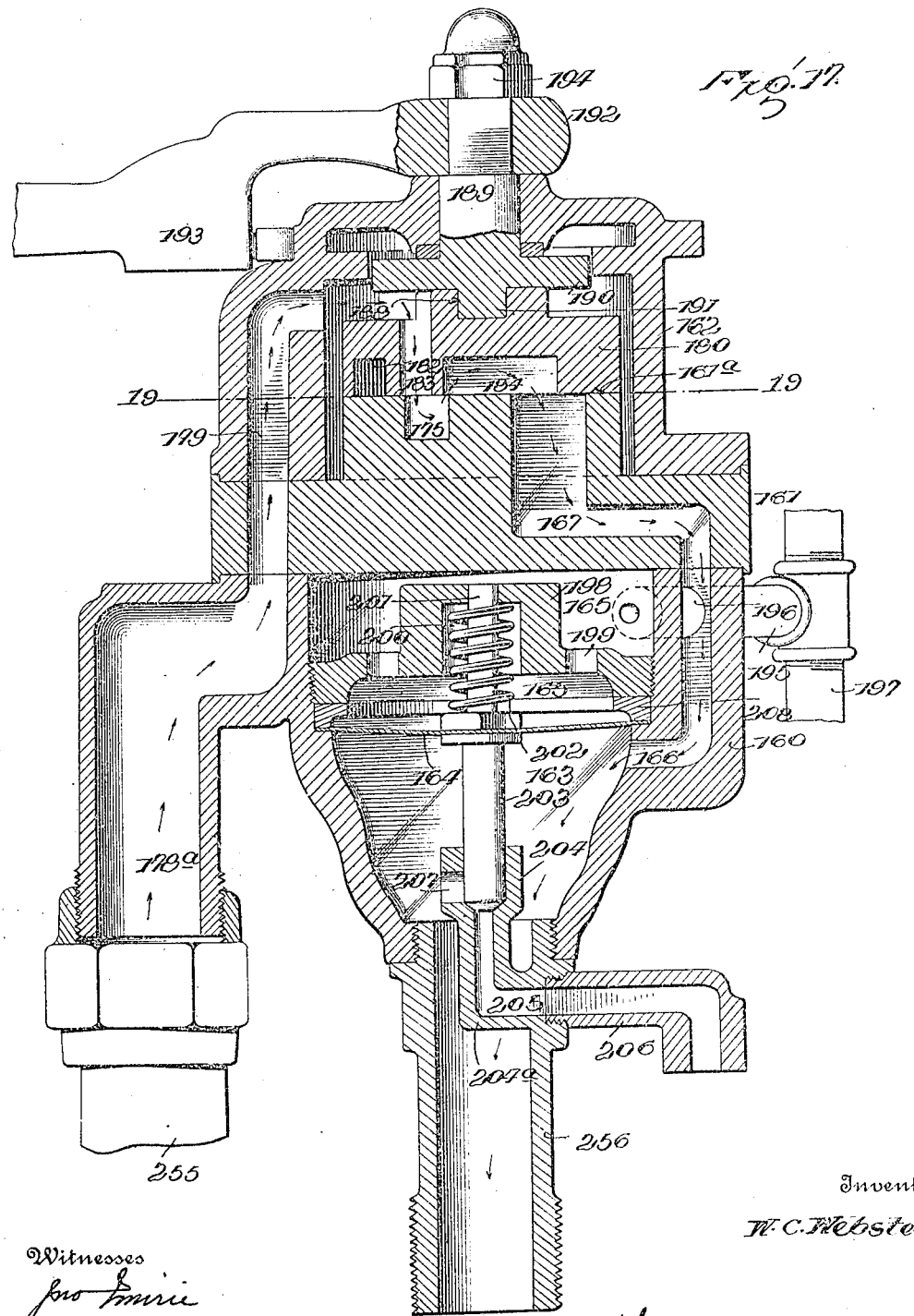

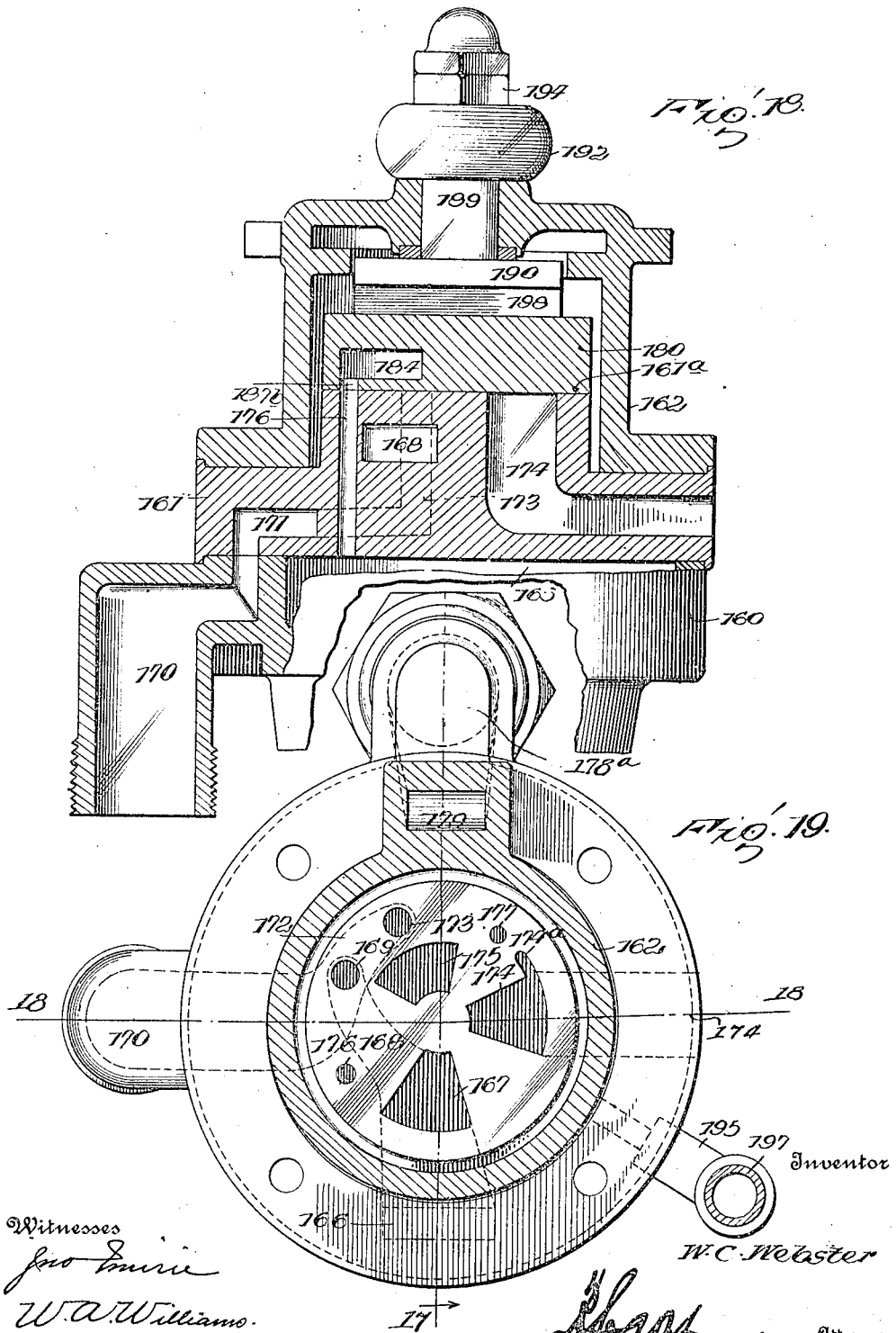

W. C. WEBSTER.
AIR BRAKE SYSTEM.
APPLICATION FILED MAY 28, 1914.

1,256,406.

Patented Feb. 12, 1918.
12 SHEETS—SHEET 9.

Release + Holding

Service

Running Service

Quick Service

Lap

Normal Release

Witnesses

Inventor
W. C. Webster
By
Attorneys.

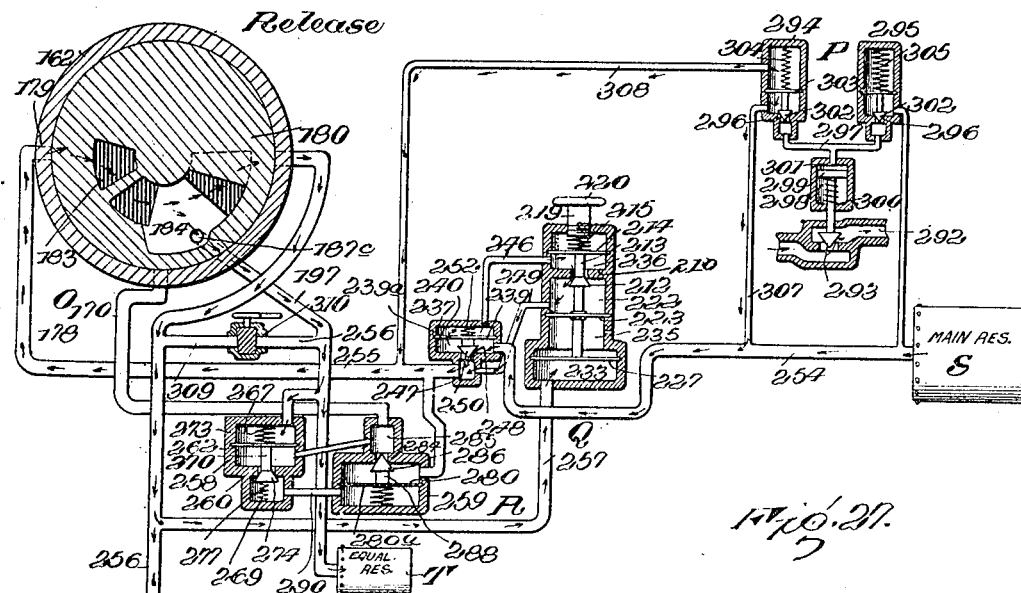
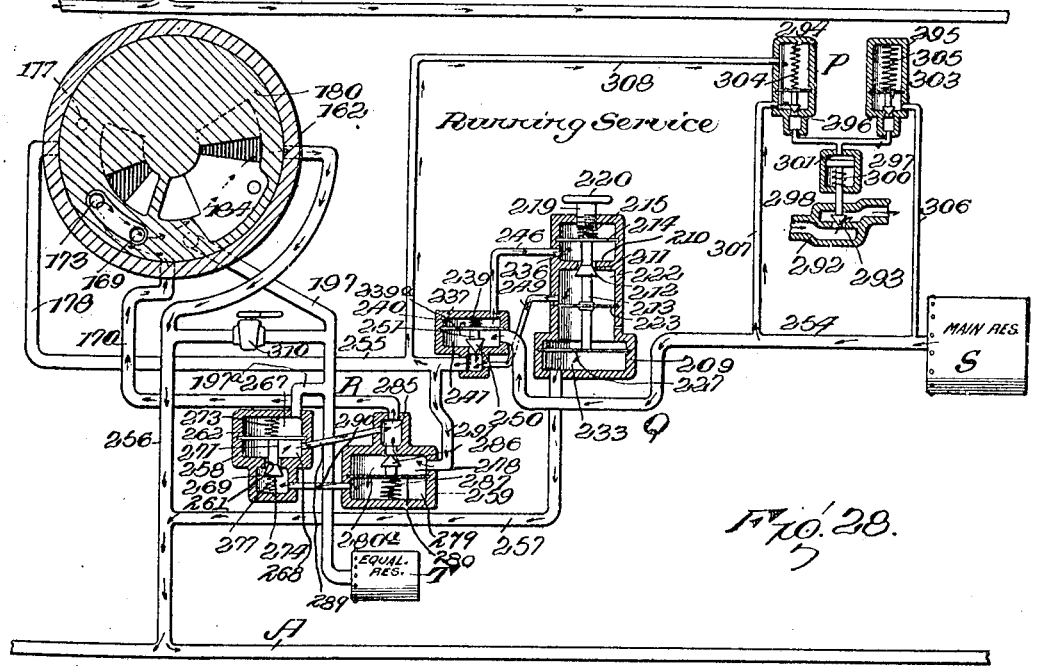

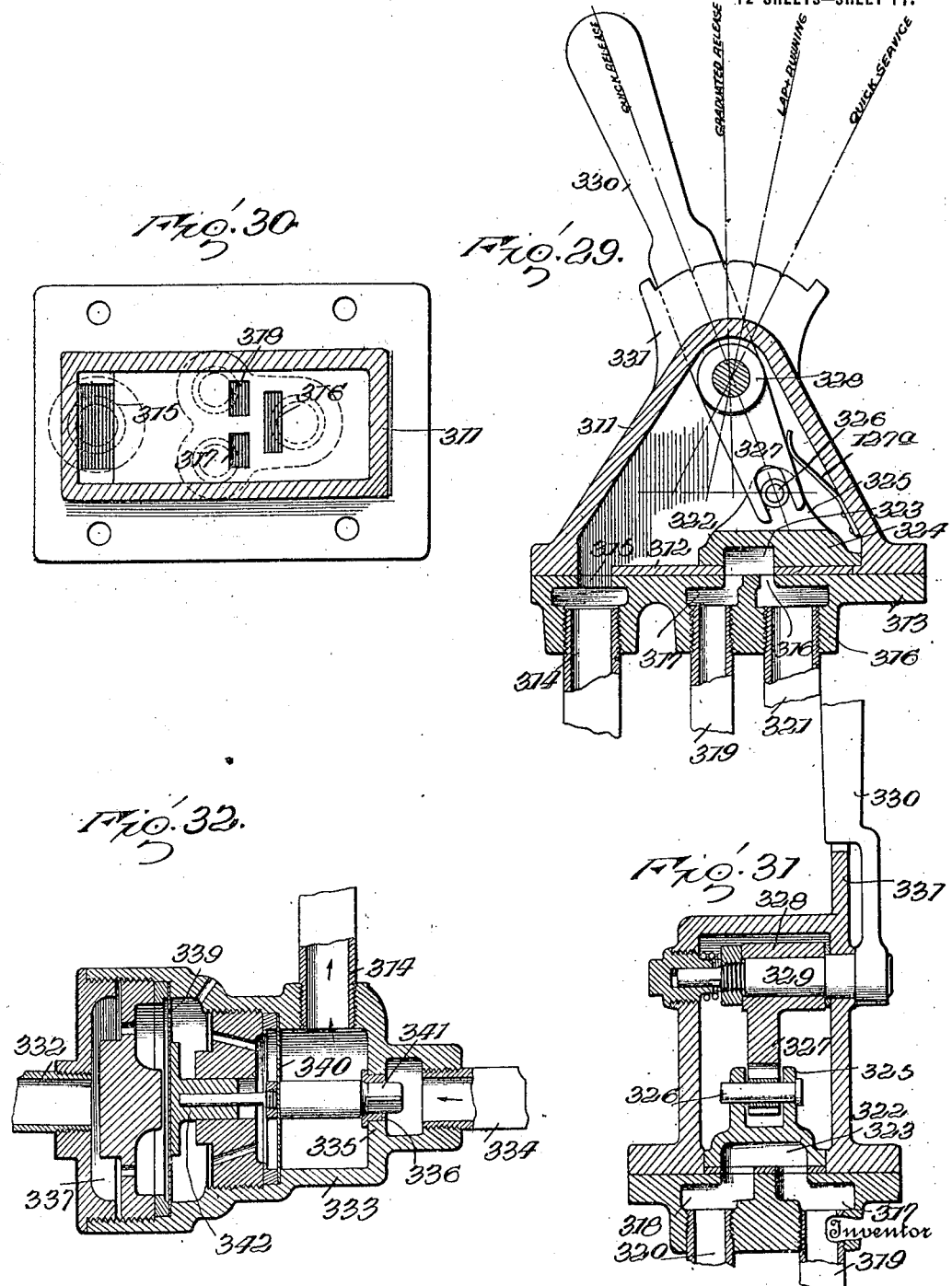

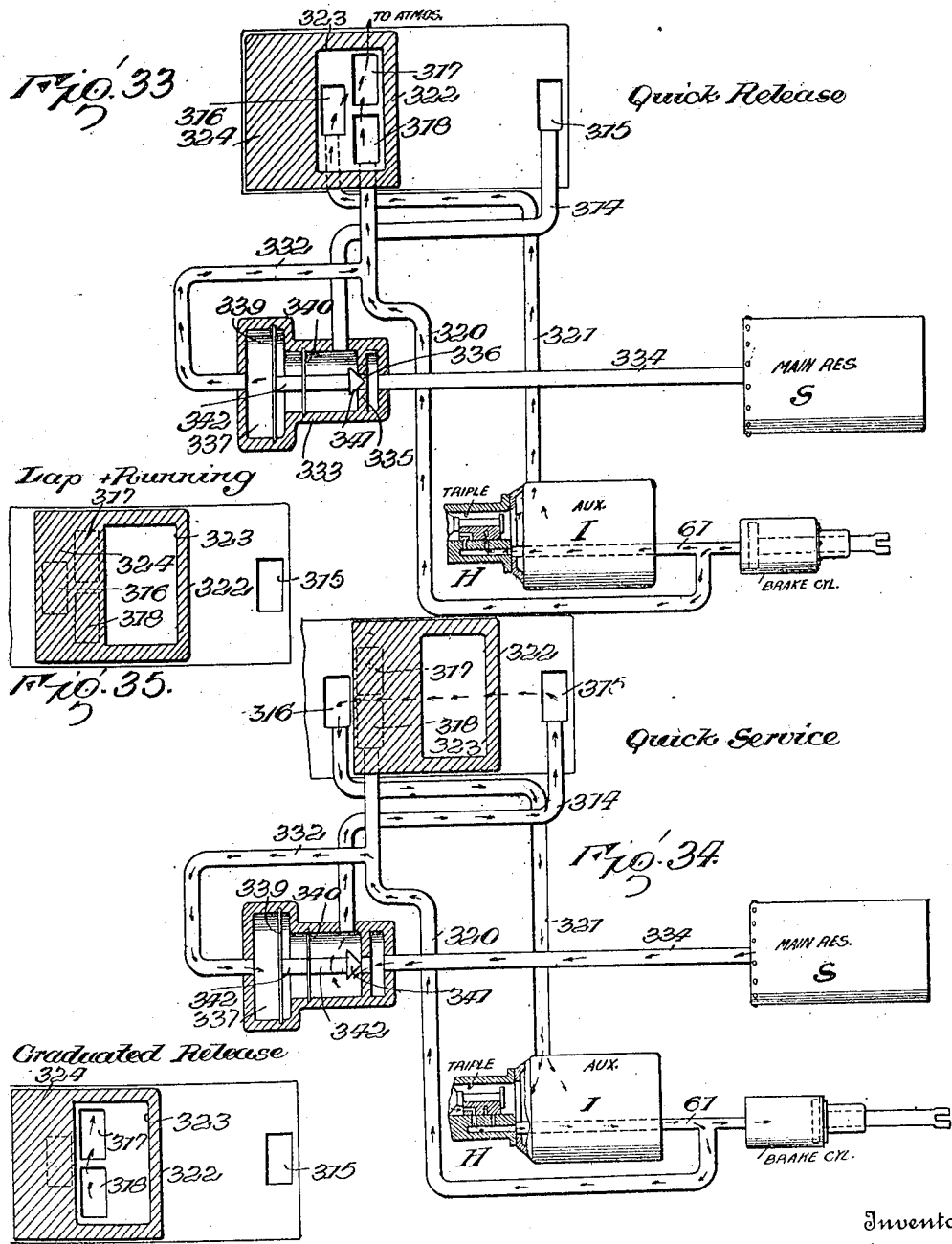

UNITED STATES PATENT OFFICE.

WILLIS C. WEBSTER, OF DUBOIS, PENNSYLVANIA, ASSIGNOR TO BUFFALO AIR-BRAKE COMPANY, OF PHOENIX, ARIZONA, A CORPORATION OF ARIZONA.

AIR-BRAKE SYSTEM.

1,256,406.                Specification of Letters Patent.      Patented Feb. 12, 1918.

Application filed May 28, 1914.   Serial No. 841,655.

*To all whom it may concern:*

Be it known that I, WILLIS C. WEBSTER, citizen of the United States, residing at Dubois, in the county of Clearfield and State of Pennsylvania, have invented certain new and useful Improvements in Air-Brake Systems, of which the following is a specification.

My invention relates to air brake systems and particularly to improvements in the standard air brake equipment whereby certain advantages are attained, as will be more fully pointed out hereafter.

One of the objects of my invention is to so construct an air brake mechanism that the brakes at the rear end of a train shall be released before the brakes at the head end are released, thus eliminating all danger of the train breaking in two or more parts.

Another object is to provide means whereby the brake cylinders of all brakes shall be supplied with air at an equal pressure, regardless of variation in length of travel of any one or more of the brake cylinder pistons, and regardless of whether such travel be below the standard travel of eight inches or above this standard travel.

Still another object of the invention is to provide means under the control of the engineer whereby pressure in the main reservoir may be raised to any predetermined degree, whereby pressure in the train line may also be correspondingly raised in proportion to the rise of pressure in the main reservoir, and whereby brake cylinder pressure may be increased in proportion to the increase of train line pressure.

In this connection, a further object is to provide means whereby the mechanism for securing this increase of pressure in the brake cylinders shall not operate on the empty cars of a mixed train, but that the brakes on these empty cars shall operate only at normal or standard train line pressure so that, though the brakes on the loaded cars may be operated by pressure above the standard, the brakes on the empty cars shall operate just as if the pressure in the train line was standard for any service reduction up to full service.

A further object is to provide means for returning the slide valve of any triple valve to release position even if the slide valve is stuck and cannot be returned by the normal rise of train pipe pressure.

A further object is to eliminate the emergency feature from the triple valves of an air brake system and provide for a quick service movement of the valves instead, thus eliminating the undesired "emergency" action of all the triple valves of a train due to one of the triple valves by accident going into "emergency" position. In this connection, a further object is to eliminate the necessity of venting a large volume of train pipe air either into the brake cylinders or to the atmosphere which is the cause of the "undesired emergency" action above referred to.

Another object is to provide means whereby the pressure in all the storage chambers and auxiliary reservoirs of a train may be built up to the pressure in a train pipe after the slide valve of the triple has come to lap position, and in this connection to maintain equalization between the pressures in the train line, storage chamber and auxiliary reservoir of the several cars at any train pipe reduction that may be made.

A further object of the invention is to provide an air brake system in which pressure in the train pipe may be built up to normal or standard pressure when the engineer's valve is in release position, and to provide means whereby the pressure in the train pipe may be kept constant after any pre-determined reduction therein is made, that it may be kept constant during service application.

A further object is to provide means whereby the train pipe may be fed with the brakes applied, and to provide means for maintaining each triple piston and the slide valve thereof when in service lap position with equal pressures on both sides of the triple piston.

Still another object is to provide valves throughout the system so formed that friction is entirely eliminated, and particularly to so construct the feed valves and the automatic brake valve that air under pressure may be fed accurately to the train pipe, while the brakes are applied and in sufficient volume to keep pressure in the train pipe constant at a definite degree, thus preventing a release of the brakes by too great a rise in the train pipe pressure.

Still another object of the invention is to provide means whereby when two or more engines are coupled together, the engineer of the head engine may have complete control of the feed valves and pumps of the following engines, and have complete use of the main reservoirs of these engines.

Still another object is to provide means whereby in double heading any reduction in train line pressure made by the engineer of the first engine will automatically cut out the feed valves of the following engines, thus preventing pressure being fed to the train line when a reduction is made and whereby a rise of air pressure in the train line will automatically act to cut in the feed valves.

A further object of this invention is to provide a mechanism which will automatically cut out the low pressure head of the pump governor upon a reduction by the engineer of the head engine so that the pumps of all the engines may operate to build up a pressure in the main reservoir equal to the adjustment of the high pressure head during brake application, and to so construct this mechanism that upon a release of the brakes at the time when train line pressure has reached a standard or pre-determined degree the low pressure head of each pump shall be automatically cut in again.

A further object of the invention is to provide means whereby the possibility of overcharging the brake pipe is eliminated, and to provide means whereby pressure may be admitted to the train pipe either slowly or quickly by adjusting the engineer's brake valve to either of two release positions, the brake valve in one position admitting air to the train pipe slowly, and in the other position admitting air to the train pipe quickly, and thus either obtaining a normal release without causing the automatic retaining valve to operate, or operating the automatic retaining valve and causing a retention of the brakes on the head end of the train.

Another object of my invention is to provide an air brake system in which the engine brakes may be applied or released entirely independently of the brakes on the cars of a train, and without affecting these brakes and without preventing the application of the brakes in the usual manner.

Still another object is to provide means whereby the "straight air" pressure applied to the engine brakes shall at all times correspond to the pressure in the main reservoir and train line, so that, if the pressure in the main reservoir is increased, the pressure applied to the engine brakes by the straight air mechanisms will also be increased upon a full service application.

Still another object is to so construct and connect the straight air brake valve of the triple valve of the engine that the straight air brake valve may be used to operate the engine triple valve to open the triple valve exhaust port in "quick release" position and to close this exhaust port in service position.

Still another object is to provide means whereby the brake valve may give either a graduated service application, a quick service application, a graduated release, or a quick release.

A still further object is to provide for operating the triple valve of the engine by straight air when there is no train pipe pressure, to thereby admit air from the main reservoir to the auxiliary reservoirs and brake cylinders of the engine or to exhaust air from the auxiliary reservoirs and the brake cylinders to thereby release the brakes.

A further object of the invention is to maintain equalization between the pressure in the train line and in the storage chamber and auxiliary reservoir at any train pipe reduction that may be made.

Another object in connection with the hand controlled valve whereby pressure in the train line may be determined and controlled, is to provide a train line feed valve that will control the train line pressure without a constant blow and waste of air while the train line pressure is charged to the desired degree. In the ordinary train line feed valve of standard equipment, there is a constant waste of air while the train line pressure remains at the desired point and the blowing off of this air is extremely unpleasant to the engineer.

Other objects will appear in the course of following description.

My invention is illustrated in the accompanying drawings, wherein:

Figure 1 is a general view showing the several parts of the air brake system in elevation;

Fig. 2 is a diagrammatic view of the several parts of the triple valve in release position;

Fig. 3 is a like view to Fig. 2, but showing the several elements of the triple valve in service position;

Fig. 4 is a longitudinal vertical section through the triple valve constructed in accordance with my invention;

Fig. 5 is a plan view of the seat for the slide valve of the triple valve;

Fig. 6 is an underside plan view of the slide valve of the triple valve;

Fig. 7 is an underside plan view of the graduating valve;

Fig. 8 is a longitudinal section of the slide valve on the line 8—8 of Fig. 6;

Fig. 9 is a longitudinal section of the slide valve on the line 9—9 of Fig. 6;

Fig. 10 is a perspective view of the slide valve looking from the underside;

Fig. 11 is a diagrammatic sectional view of the equalizing mechanism F, the storage chamber and a portion of the slide valve and graduating valve;

Fig. 12 is a diagrammatic view, partly broken away, of the slide valve in its release position;

Fig. 13 is a like view to Fig. 12, but showing the slide valve at its first movement toward service position;

Fig. 14 is a like view to Fig. 13, but showing the valve in service position;

Fig. 15 is a like view to Fig. 14, but showing the graduating valve in service lap position;

Fig. 16 is a like view to Fig. 14, but showing the slide valve in quick service position;

Fig. 17 is a vertical diagrammatic section of the engineer's brake valve, the section being taken on the line 17—17 of Fig. 19;

Fig. 18 is a vertical section of the engineer's brake valve taken on the line 18—18 of Fig. 19;

Fig. 19 is a horizontal section of the brake valve on the line 19—19 of Fig. 17, the rotary valve being removed;

Fig. 20 is a perspective view of the rotary valve looking toward the under face thereof;

Fig. 27 is a diagrammatic view of the engineer's brake valve, the feed controlling mechanism, and the pump governor, the engineer's valve being in the release position;

Fig. 28 is a like view to Fig. 27 but showing the parts in running service position;

Fig. 29 is a vertical section of the valve controlling the application of the straight air;

Fig. 30 is a plan view of the slide valve seat of the straight air controlling mechanism;

Fig. 31 is a vertical section of the straight air controlling mechanism shown in Fig. 29;

Fig. 32 is a longitudinal section of the automatic controlling valve for the straight air;

Fig. 33 is a diagrammatic view of the straight air mechanism, showing the parts in quick release position;

Fig. 34 is a like view to Fig. 33, but showing the parts in quick service position;

Fig. 35 is a diagrammatic view of the controlling valve chamber, showing the slide valve in lap and running position;

Fig. 36 is a like view to Fig. 35, but showing the slide valve in graduated release position.

Corresponding and like parts are referred to in the following description and indicated in all the views of the accompanying drawings by the same reference characters.

Figure 21:
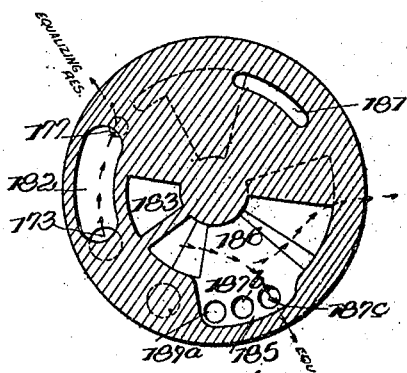
Fig. 21 is a diagrammatic horizontal sectional view of the rotary valve, showing its position during a retarded release of the brakes.

In Fig. 1 is shown a general view of a complete air brake system constructed in accordance with my invention, and throughout the several figures of the drawings, A represents the train line or brake pipe, the pressure in which is controlled by the engineer's brake valve O. The several brake cylinders are designated B; the auxiliary reservoir is designated I, and the main reservior S. The governor is indicated by the letter P. In order to secure a clear understanding of my brake mechanism, it is necessary first to refer to Figs. 2 to 16, inclusive, which show the construction of the triple valve.

The triple valve mechanism includes an automatic pressure retaining device, which is designated C in Fig. 2, brake cylinder pressure equalizing mechanism, designated D+ and D—; mechanism for securing brake cylinder pressure in excess of the normal or standard amount, which is designated E; an equalizing valve F; an auxiliary venting mechanism G, and the usual piston and slide valve and allied parts H. In Figs. 2 and 3, these several elements of the triple valve, for the sake of clearness, are shown separated from each other, and as if these parts were connected by pipes. Further, the several elements of the triple valve are illustrated without any details of construction. As a matter of fact, all of the elements of the triple valve above enumerated are conjoined in one valve body, as is illustrated and fully described in my pending application on triple valve, Serial No. 841,918, filed on the 28th day of May, 1914. In the present case, therefore, it has been deemed advisable to show the elements of the triple valve in their simplest form, and to show these elements not in the actual manner in which they would be arranged but diagrammatically. It will thus be understood that all of the elements of the triple valve illustrated in Figs. 2 and 3, as well as the usual piston and slide valve mechanism, are contained within the triple valve casing, this triple valve as a whole being designated H.

Referring now to Figs. 2 to 7, inclusive, and 12 to 15, inclusive, and particularly to Fig. 4, it will be seen that the triple valve has the usual body 4, which at one end abuts against and is connected to the auxiliary reservoir I in the usual manner. At its opposite end the body is closed by a cap 5. Disposed within the chamber 6 of the body is the piston 7, this chamber 6 having the usual bushing 8 grooved, as at 8ª, to admit air to the auxiliary chamber. The cap incloses a chamber 9 within which is disposed the graduating stem 10 and spring 11. The outer end of the stem is supported in the cap nut 12 and the inner end is supported by a spider.

Beyond the chamber 6 the valve body is formed with a valve chamber 13, cylindrical in form and provided with a bushing 14, the bottom of which is flat and forms a seat for the usual slide valve. The chamber 13 opens at one end into the auxiliary reservoir. The valve stem carries the usual beveled shoulder 15 having the usual groove 16 in its periphery. The piston stem 17 carries at its inner end a spider 18, and disposed between this spider and shoulder 15 is the slide valve 20 which is, as usual, shorter than the stem 17. Operating on the upper face of the slide valve and carried in a recess in the stem 17 is the graduating valve 101, illustrated in Fig. 7. The slide valve is held to its seat by a spring 21.

By reference to Fig. 4, it will be seen that to the underside of the valve body 4 is attached a trap or dirt collector 24. This is provided in its bottom with a plug 26 whereby dirt may be removed and water drained away. This trap or dirt collector has the usual nipple projecting from one end thereof, whereby the pipe may be connected to the train line A. An approximately horizontal flange or baffle 27 impedes the passage of dirt from the train pipe into the triple valve. The upper face of the body 23 is formed with a chamber 28, and the wall between this chamber and the chamber 24 is perforated for a bushing 29 in which seats a check valve 30 held to its seat by a spring.

It will be seen that the upper portion of the trap or dirt collector 24 is connected by means of a passage 92 to the chamber 9, and it will also be seen that the forward wall of the trap or collector 24 immediately below the intersection of the passage 92 with the chamber 84 is downwardly extended, as at 93, toward the baffle flange 27, thus forming a relatively contracted opening from the lower portion of the chamber 24 into the upper portion thereof. Thus there is always a communication between the train pipe A and the chamber 9, and the chamber 6 through the dirt collector 24 and the passage 92.

The first device to be considered in connection with the triple valve is the means for admitting pressure from the auxiliary reservoir to the brake cylinder whereby to set the brake, and the means for simultaneously disconnecting the brake cylinder from communication with the open air. It is also necessary to consider in connection with this means the mechanism which I have provided for retaining the brakes of the forward cars of a train in braking position until after the brakes of the rear cars of the train have been released. This mechanism is hereafter denominated the automatic retainer and is designated C in Fig. 2.

This mechanism comprises a valve casing 31, which, in the actual working embodiment of my invention, is formed with or connected to the valve body 4. This valve casing 31 is formed with two chambers 32 and 33, the separating wall 35 between these chambers being formed with a perforation 34, the under face of the wall surrounding the perforation forming a valve seat. Disposed in the upper portion of the valve casing above the wall 35 is a diaphragm 40 providing a chamber 41 above the diaphragm and a chamber 32 below the diaphragm. Disposed in the lower end of the valve casing is a diaphragm 45, and disposed above this diaphragm 45 is a diaphragm 48. It will be seen by reference to Fig. 2 that the diaphragm 45 is approximately twice as large as the diaphragms 48 and 40. A chamber 46 is formed below the diaphragm 45, and a space 47 is formed between the diaphragm 48 and the diaphragm 45. Seating against the valve seat 34 is a valve 52 which is engaged with the diaphragms 45, 48 and 40, and urging this valve downward is a spring 58. The space 46 below the diaphragm 45 is connected by means of a duct 59 with the space above the diaphragm 40. This duct opens into the space above the diaphragm 40. This duct opens into the space above the diaphragm 40 by means of a very much reduced or choked port 60.

The face or seat for the slide valve has a transverse recess or cavity $a^4$ having a port $a$ which is connected by means of the passage $a'$ with the chamber 32 below the diaphragm 40. The chamber 33 above the diaphragm 48 is connected by means of a port $a''$ with a passage $a'''$ leading to the brake cylinder by means of a pipe 61 which passes, as usual, through the auxiliary reservoir. The chamber 46 is connected to the chamber 28 by means of a passage $b'$ opening by means of a port $b$ into said chamber. The space 47 opens by means of a port 62 to the atmosphere.

Preferably the passage $a'$ is connected through a check valve chamber 63 to the passage $a''''$. Disposed within the chamber 63 is a check valve 64 which closes against back pressure from the brake cylinder but opens to a rise of pressure in the passage $a'$ to permit air from the auxiliary reservoir to pass by the retaining valve and flow direct to the brake cylinder.

It will now be necessary to consider the ports in the slide valve which connect with the port $a$ and with the retaining valve structure. As is seen in Fig. 5, the cavity $a^4$ extends transversely from port $a$. The slide valve 20 is provided with a cavity $a^5$, approximately T-shaped, into one arm of which extends a longitudinal passage $a^6$, which at its forward end opens through the upper face of the slide valve. The cavity $a^5$ is brought into communication with the air in chamber 13, and, therefore, with the auxiliary reservoir upon the initial movement of the slide valve through opening of passage $a^6$ by movement of the operating valve 101. Also formed in the face of the slide valve seat is a transversely extending cavity $x$ which leads by the port $x'$ to the atmosphere. The underside of the valve is provided with the cavity $x^2$, which is adapted to bridge the exhaust cavity $x$ and the cavity $a^4$. Under normal conditions, that is, when the slide valve is in its "release" position, the cavity $x^2$ connects the cavity $a^4$ with the cavity $x$. Hence the brake cylinder is connected with the open air. Now upon a movement of the slide valve to service position, as illustrated in Fig. 14, the cavity $x^2$ will take the position shown in dotted lines in Fig. 14, cutting off the connection of $a^4$ with $x$, and the cavity $a^5$ will be over the cavity $a^4$, thus connecting the port $a^4$ with the auxiliary reservoir through the passage $a^6$.

The operation of this portion of my invention is as follows:

Under normal circumstances, that is, when the brakes are disposed in "release" position, the valve 52 is held open by the force of the spring 58 and air pressure. This would not be true were no spring used, though the pressure in chambers 41 and 46 would be the same, as the greater area of the diaphragm 45 compared with the diaphragm 40 would hold the valve closed. This greater power acting to force the valve upward is counterbalanced, however, by the spring 58 which, therefore, holds the valve 52 open so long as the pressure in the chamber 41 is equal to the pressure in the chamber 46.

Now upon a reduction of pressure in the train pipe and a movement of the slide valve to apply the brakes, the port $a$ will be opened and air will flow from the auxiliary reservoir to the brake cylinder by the way of the passage $a'$, the chambers 32 and 33 and the passages $a''$ and $a'''$, or by way of the chamber 63 and the passage $a''''$. As the brake pipe pressure is reduced, the pressure in the chamber 46, which in service position of the triple valve communicates with the auxiliary reservoir, is also reduced to the same extent, but as air in the chamber 41 is impeded in its outward flow by the restricted port 60 it follows that the pressure in the chamber 46 will be less than in the chamber 41. Air is thus free to pass from the auxiliary reservoir to the brake cylinder.

When now the release of the brakes is secured by operating the engineer's valve and raising the pressure in the brake pipe the slide valve will shift again to release position. This will connect the port $a$ with the exhaust port. While the pressure in the chamber 46 will increase with the increase of train pipe pressure the pressure in the chamber 41 will not increase at the same rate because of the restricted port 60. Hence, there will be greater pressure below the diaphragm 45 than above the diaphragm 40 and the valve 52 will close, trapping the air in the brake cylinder. Of course, the pressure in the brake cylinder will also hold the valve 64 closed. The valve 52 will be held closed until such time as the pressures in the chamber 41 and the chamber 46 are equalized, whereupon the spring 58 opens the valve 52 and the brake cylinder pressure is exhausted to the atmosphere allowing the brakes to release.

The reason for using the check valve 64 and by-pass 63 is that not only does the by-pass allow air to flow from the auxiliary reservoir to the brake cylinder without the necessity of the air passing through the retainer C, but it permits a re-application of the brakes before the air in the upper and lower chambers 41 and 47 has had a chance to equalize.

If this by-pass were not provided, then upon a re-application of the brakes, very shortly after a previous application—so shortly that the pressures had not equalized in the chambers 41 and 46—the valve 52 would be held closed, and would prevent the inlet of auxiliary reservoir air pressure to the brake cylinder upon this second reduction.

One very great advantage due to the action of the automatic retainer is that by it I get a release of the brakes at the rear of the train before the brakes at the head of the train are released. This is due to the fact that the holding of air in the brake cylinder by the difference in pressure between the chamber 46 and the chamber 41 can only occur when there is a relatively sudden rise in pressure in the brake pipe. When the rise of pressure is slow in the brake pipe and in the chamber 46, the rise of pressure in the chamber 41 will be nearly as rapid as in the chamber 46.

It is, of course, understood that, when there are many cars to a train and consequently a long brake pipe or train pipe, the air pressure will rise in the forward or head end of the train pipe before it does in the rear end thereof, and the rise of pressure in the brake pipe will be, therefore, slower at the rear end. It follows, therefore, that I will only get this trapping or holding of the air in the brake cylinders, by the action of the diaphragms 48 of the several triple valves as far back in the train as the rise of air pressure is rapid enough to secure an upward movement of the diaphragm 45 which will overcome the power of the spring 58.

With my construction, it is not necessary to admit pressure to the brake pipe beyond the amount of the reduction made. Thus the auxiliary reservoirs are re-charged quickly, and the train pipe pressure never gets but slightly above the auxiliary reservoir pressure. This insures an immediate application of the brakes at any time with full braking power.

The object of the mechanism which will now be described is to provide means whereby the pressure in the brake cylinders may be controlled by building up or increasing the pressure in brake cylinders whose piston travel is longer than 8 inches and by exhausting air from or reducing excess pressure in brake cylinders having a piston travel shorter than 8 inches.

The triple valve is provided with a storage chamber 65 and a valve body or casing 66 disposed opposite the chamber 65. This valve casing 66, which is designated generally D+, incloses a chamber divided into two sections 67 and 68 by means of a diaphragm 69. A spring 75 bears at one end against the upper end of the valve casing and at its other end against the diaphragm 69. The floor of the chamber 67 is formed with a port 78, which is controlled by a valve 79 carried by a stem 80 which extends upward and engages against the underside of the diaphragm 69. Thus a descent of the diaphragm will open the valve 79. A light spring surrounds the stem 80 and urges the valve to its seated position.

Adjoining the valve body 66, and preferably forming part thereof, is, as illustrated in my pending application above referred to, a second regulating device, designated D—. This valve casing is designated 66$^a$, and is divided into two separate chambers 84 and 85 by a diaphragm 86. The floor of the chamber 84 is perforated, the wall of the perforation forming a valve seat, and co-acting with this valve seat and normally closed against the seat is a valve 89 which is carried by the diaphragm 86 and is movable therewith. A spring 81 urges the diaphragm to its normal position and the valve 89 to its seat. It will be obvious now that, when the pressure within the chamber 84 is greater than the pressure in the chamber 85, the diaphragm 86 will be forced upward, raising the valve 89 from its seat and allowing the pressure in the chambers 84 and 67 to be vented to the atmosphere. When the pressure in the chamber 84 decreases, however, beyond a pre-determined point, it is obvious that the valve 89 will close and stop this venting action.

The valve seat 78 opens into the chamber 94 from which a duct 95 leads into the chamber 28. From this chamber 28 a duct 96 leads to an equalizing chamber 97 (the chamber F), the construction and purpose of which will be later described.

The chamber 85 is connected with the chamber 68 by a duct 98, and the chamber 84 is connected with the chamber 67 by a duct 99. Thus pressure in the chamber 68 is the same as that in chamber 85, and pressure in the chamber 67 the same as that in the chamber 84. From the chamber 67 leads a passage $c'$, which terminates in a port $c$ in the slide valve seat. This port $c$ co-acts with an angular cavity $c''$ in the under face of the slide valve, which, when the slide valve is in service position, as shown in diagram in Fig. 3 and in Fig. 14, connects the port $c$ with the cavity $a^4$, and thus with the brake cylinder by way of passages $a'$ and $a''$. When the slide valve is in release position, however, the cavity $c''$ is blanked. Thus, when the slide valve is in service position, the lower chambers 67 and 84 are both in communication with the brake cylinder. The upper chambers 68 and 85 are connected by means of a duct or passage 100 with a port $d$ which opens into a transverse cavity $d'$ formed in the upper face of the valve seat, which co-acts with a cavity $d''$ extending longitudinally in the under face of the slide valve. This cavity $d''$, when the valve is in release position, as in Fig. 12, connects the port $d$ with a cavity $e$ in the face of the valve seat. This cavity $e$ extends diagonally and in the path of movement of a cavity $e'$ which it overlaps in release position, as shown in Fig. 12. The cavity $e'$ in turn is connected by a duct $e''$ to an angular cavity $e'''$ on the lower face of the valve. The end of this cavity opposite the duct $e''$ is disposed to overlap one end of the exhaust cavity $x$ which, as before explained, is connected to the atmosphere. Also formed in the slide valve is a small longitudinal passage $f$ opening at one end through the under face of the valve at $f'$, and at its other end through the upper face of the valve at $f''$. At release position of the valve, both ends of the passage $f$ are blanked, but at service position the end $f'$ overlaps the cavity $d'$, while its other end is overlapped by a T-shaped cavity $g$ formed in the under face of a graduating valve 101 carried in a recess in the under face of the stem 17. In release position also the port $o$, which is formed in the under face of the slide valve and which is connected with the port $h$, connects the storage chamber 65 with the train pipe, by the cavity $i$, passage $m$ and chamber 28, and the auxiliary reservoir with the train pipe by the port $h''$.

In service position, this port $g$ in the graduating valve connects the port $f''$ with the port $h$ forming one end of a passage $h'$ and opening upon the upper face of the slide valve 19. The other end of passage $h'$ opens into a cavity $i$ which in service position of the valve 19 slightly overlaps a port $j$, of a passage $j'$ which leads to the storage chamber 65. Thus it will be seen that at release position the upper chambers 68 and 85 are connected to the atmosphere, while in service position they are connected to the storage chamber until the valve 20 moves to lap position.

The capacity of the storage chamber has the same relation to the capacity of the chambers 68 and 85 as the capacity of the auxiliary reservoir has to a brake cylinder having a 10-inch stroke. The lower chambers 67 and 84 in service position are connected to the brake cylinder B. Hence on the upper side of the diaphragms 69 and 86 we have a pressure equal to that of a brake cylinder with a 10-inch piston travel (the springs 75 and 81 and air pressure exerting a pressure against the diaphragm equal to a pressure exerted by a cylinder having an 8-inch piston travel), while on the other side of the diaphragm we have a pressure equal to that of the brake cylinder, whatever that may be. The spring 94 coöperates with the spring 75 to insure a delicate control of the valve 79 so that it will close exactly when pressures in the chambers 67 and 68 bear the proper relation to each other.

The object of the brake cylinder equalizing devices D+ and D— heretofore described is to build up pressure in those brake cylinders having a piston stroke of over 8 inches and reduce pressure in those brake cylinders having a piston stroke of less than 8 inches. The operation of the equalizing devices D+ and D— is as follows:

On a movement of the slide valve to service position by a reduction of train pipe pressure, communication is opened, as before explained and as most clearly seen in Fig. 3 from the chambers 67 and 84 to the brake cylinder, and from the chambers 68 and 85 to the storage chamber 97. As the storage chamber has a pressure of 70 pounds, it follows that after a 7 pound reduction in the train line is made the connected chambers 68 and 85 will have a standard pressure therein of $10\frac{1}{2}$ pounds (which includes the pressure of the springs 75 and 81) or exactly the same as the brake cylinder if the piston travel thereof is of the standard length of 8 inches.

If now the brake cylinder pressure is too low—that is below the standard for a cylinder having a piston travel of 8 inches—the pressure on the under side of the diaphragm will be less than on the upper side, and the pressure on the upper side will cause the diaphragm to move downward opening the valve 79 and letting train pipe air into the chamber 67, and thence to the brake cylinder, as seen in Fig. 3. When the pressure in the two chambers 67 and 68 has become equalized, the spring forces the valve 79 upward, closing the opening 78.

If now, the travel of the piston is shorter than 8 inches the reverse action will occur. In this case, the pressure on the under side of the diaphragm 69 will be greater than on the upper side and the valve 79 will be held closed. In this case, however, the pressure on the under side of the diaphragm 86 will be greater than on the upper side, the valve 89 will be lifted, and the excess pressure will escape until the pressures above and below the diaphragm are equalized, when the valve will close.

With my improved device, I equalize the pressures in the auxiliary reservoirs and brake cylinders on every car in the train and, therefore, am able to create a uniform release, one car after the other, by exhausting the excess pressure from the brake cylinders having short piston travels at each brake pipe reduction. I thus keep the auxiliary reservoirs, and the brake cylinders having short piston travel from equalizing at any higher pressure than those with standard piston travel and build up the pressure in those cylinders having long piston travel to the standard pressure, thus causing the equalization between the auxiliary reservoirs and the brake cylinders to stand at the same pressure either with a full service reduction or any graduated reduction causing the brakes to release uniformly one car after the other.

Another object of my invention is to provide means to automatically create a high brake cylinder pressure from a small brake pipe reduction and maintain the high pressure in the brake cylinder during the time that the brakes are applied. This mechanism is particularly applicable for use in mountain service and on high speed trains or trains which are heavily loaded and is automatically controlled by the engineer.

With my improved mechanism, which is now about to be described, the engineer is able to create any brake cylinder pressure desired from a small brake pipe reduction, say 5 to 10 pounds, and yet, when release is made, we do not have any larger volume to recharge than is usual with the standard equipment. My improved mechanism applies as well to empty car trains as to loaded car trains, and it lies entirely within the power of the engineer to increase this brake cylinder pressure if he sees fit. With my mechanism the engineer may have as much increase in brake cylinder pressure upon the first small brake pipe reduction as he may desire. With my equipment and with a normal train line pressure of seventy pounds, I attain but a slight excess brake cylinder pressure for any given reduction as the pressure against the lower side of the diaphragm 111 is then but slightly less than that against the upper side. In fact just enough train line air passes through the valve 113 before the pressures against the diaphragm 111 are equalized to cause a serial venting at the triple valve and a consequently rapid application of the brakes.

The mechanism whereby this result is obtained is designated E in Figs. 2 and 3, and includes a valve casing, designated 102, which preferably is integral with the main valve body, as illustrated in my co-pending application filed May 29, 1914 and bearing the Serial No. 841,918. This casing which is diagrammatically shown in Figs. 2 and 3, is divided into two parts by a diaphragm 111 to provide an upper chamber 103 and a lower chamber 120. Attached to this diaphragm in any suitable manner and extending up therefrom is a valve 113. A coil spring 115 is disposed below the diaphragm and urges the valve to its seat.

Extending from the space 120 below the diaphragm 111 is a passageway or duct $k$ which opens through the face of the slide valve seat in the chamber 13 at the port $d$, as shown clearly in Fig. 2. Opening into the space above the diaphragm 111 is a passageway or duct $k''$ opening by a port $k'''$ into the cavity $e$ in the slide valve seat. A duct $k^4$ extends from the upper end of the chamber 103 above the valve 113 and opens into the plug valve or stop cock 118 having a handle 119 whereby it may be rotated. This stop cock is disposed so as to cut-off or permit passage of air from the chamber 120 through the duct $k$ and from the upper end of the chamber 103 to the duct $k$. This stop cock 118 is for the purpose of cutting out the mechanism E on empty cars where excess brake pressure is not desired and where only normal pressure is needed to operate the brakes.

In the release position of the parts, as shown in Fig. 2, both of the passages $k$ and $k''$ are connected by the cavity $d''$ to the open air by way of the cavities $e$ and $e'$, the duct $e''$, the cavity $e'''$ and the cavity $x$. When the parts are in service position, the passage $k$ is connected by the cavity $d'$ to the duct $f$ and to the cavity $g$ in the under side of the graduating valve 101, which, as before described, is connected by means of the duct $h'$ to the cavity $i$. This cavity $g$ of the graduating valve in service position of the parts is disposed to connect the port $f'''$ with the port $h$ and thus connect the port $j$ with the cavity $d'$. This port $j$, as before stated, is the opening of the passage leading into the storage chamber 65. Thus in the service position of the parts, the chamber 103 above the diaphragm 111 is connected to the train pipe A, through the passage $k''$, port $k'''$, passage $e$, the cavity $e'$, the passage $e''$, the cavity $e'''$, the port $m$ and the check valve chamber 28, while the chamber 120 below the diaphragm 111 is connected to the storage chamber through the passage $k$, port $d$, the cavity $d'$, the passage $f$ in the valve, the cavity $g$ in the graduating valve, through the passage $h$ in the slide valve into the cavity $i$ and thence by the port $j$ and the passage $j'$ into the storage chamber. It will also be seen that in this position of the parts the lower chamber 120 of the casing 102 is also connected to the upper compartment or the chamber 68 of the equalizing valve chamber D+. In service position, the space beneath the diaphragm 111 has in it on a seven pounds reduction a pressure of about seven pounds (being a pressure equal to the pressure in the chambers 68 and 85 without the springs) which, plus the spring 115, equals a pressure of 65 pounds. If, however, the train line pressure is increased to say 90 pounds and a reduction is made to apply the brakes, the pressure below the diaphragm 111 will be the same as it would with the same reduction and a normal 70 pounds train pressure, while air from the train line will be admitted through the check valve chamber 28, the port $m$, the cavity $e'''$, the passage $e''$, the cavity $e'$, the passage $e$, the port $k'''$ and the passage $k''$ to the chamber 103 above the diaphragm 111. The excess air pressure thus created in the upper chamber 103 will cause depression of the diaphragm 111, with the result that the air admitted, as above described, will pass through the valve 113, the passage $k^4$, the passage $k$, the port $b$ and the passage 100 to the upper chambers 68 and 85 of the brake cylinder pressure regulating device. This extra pressure in the chamber 68 of the equalizing valve D+ will cause the valve 79 to open so that there will be direct communication between the train pipe and the brake cylinder.

When the pressure is equalized in both chambers of the valve structure D+ the valve will shut. Thus if the train pipe has in it a pressure of 90 pounds and a 5 pound reduction is made, a portion of the pressure in the train pipe will be transferred, upon a movement of the slide valve to service position to the brake cylinder. When the graduating valve moves back to service lap position, as in Fig. 15, it will cut off connection between the storage chamber and the chambers E and D+. It will also be seen that by rotating the handle 119 to a slight extent in one direction, the valve plug 118 or cut-out cock will be turned so as to cut-off communication between the mechanism E and the slide valve. I have provided this cut-out cock so that in mixed trains of empty and loaded cars, the empty cars may be cut out, if so desired, so as to create a high brake cylinder pressure on the loaded cars alone and the standard degree of braking power may be applied on the empty cars of the train. This permits, however, of a mixed train of both empty and loaded cars being operated with standard brake pipe pressure of 70 pounds without disturbing the cut-out cocks on the empty cars as the mechanism E operates only when excess brake pipe pressure is employed.

It will be seen that my improved mechanism allows the controlling chamber, that is the chamber E, to be charged direct from the train pipe pressure and the supply is controlled by a valve and spring adjusted to stand 65 pounds pressure before the valve will open. In other words, it will require some 68 pounds to open the valve and any pressure above 68 pounds after a brake pipe reduction of five pounds has been made will govern the amount of excess brake cylinder pressure. In other words, this excess brake cylinder pressure depends on the pressure in the brake pipe before the reduction of five pounds is made.

For example, if with a brake pipe pressure of 70 pounds a 5 pound reduction is made, this reduction shifts the valve 20 to service position and allows the reduced train line pressure to flow to the chamber 103. The resultant pressure in the chamber 103 will be three pounds below the set adjustment of the valve and spring so that there will be no charging of the chambers 68 and 85 through this valve but if, however the brake pipe pressure was, for example, 80 pounds, before the 5 pounds reduction was made, this reduction will leave a brake pipe pressure of 75 pounds and this pressure in the chamber 103 will be sufficient to overcome the tension of the spring 115 and allow 7 pounds excess pressure to pass through the valve 113, which will give an excess pressure of 7 pounds in the chambers 68 and 85, and the chamber 120 will, of course, build up to the same pressure as the chambers 68 and 85 as soon as the combined pressures of the spring 115 and air in the chamber 120 has increased enough to overcome the pressure in the chamber 103, the valve 113 will close, stopping the flow of air from the train line to the chambers 68 and 85. This in turn will give 7 pounds excess brake cylinder pressure. If the brake pipe pressure stands at 90 pounds and a 5 pound brake pipe reduction is made, this will leave 85 pounds brake pipe pressure and give an excess pressure of 17 pounds in the chambers 68, 85 and 120 and an excess pressure of 17 pounds in the brake cylinder, and so on according to the amount that the brake pipe pressure was raised. The valve 113 is, therefore, entirely controlled by the excess pressure carried in the brake pipe before the brakes have been applied and the triple piston and main slide valve have moved into service position or service lap position, allowing whatever pressure there may be in excess of its setting to enter the equalizing chambers 68 and 85.

One of the many advantages of my mechanism lies in the fact that the excess brake pressure controlling mechanism E eliminates any necessity of setting hand brakes at the top of a grade.

I will now describe the equalizing mechanism or valve designated F in Figs. 2 and 3. This mechanism has for its object to provide for feeding the storage chamber 65 and auxiliary reservoir from the brake pipe with the triple piston and slide valve in lap position and to provide means whereby the pressure within the storage chamber and within the auxiliary reservoir may be built up to that of the brake pipe after the valve has shifted to lap position. In order that a triple valve can assume lap position, it is necessary that the auxiliary reservoir pressure shall drop slightly below the brake pipe pressure, and in order to hold the triple valve in service lap position and feed the brake pipe without releasing the brakes, it is necessary to build up the pressure in the storage chamber and auxiliary reservoir equal to the train line. The mechanism designated F then is for the purpose of building up and maintaining the pressure in the storage chamber and auxiliary reservoir equal to that in the brake pipe and to maintain the pressure in those chambers during the service application or while the triple valve is in lap position.

Referring to Figs. 2, 3 and 11, it will be seen that I provide a chamber 122 within which is disposed a diaphragm 123, which divides the chamber into two parts, this diaphragm being formed with a very small perforation 127. The opposite end walls of the valve chamber are provided with the oppositely disposed seats 128 and 129 with which a double valve 130 co-acts. This double valve is provided at opposite ends with the conical heads 131 and 132 co-acting with the valve seats 128 and 129 respectively.

One end of the valve casing 122 is provided with an enlargement 133, and the other with an enlargement 134. From the enlargement 134 extends a duct or passage 135 which connects to the storage chamber 65. Extending from the enlargement 133 is a duct 96 which extends into the chamber 28, as previously described and as clearly shown in Fig. 11.

It will be seen now that in release position of the triple valve the storage chamber 65 is connected by the passage $j$ with the brake pipe through the cavity $o$, the passages $o'$ and $h'$ into the cavity $i$ and through the passage $m$ to the chamber 28 and that the equalizing valve F is connected on one side of the diaphragm with the storage through the passage 135 and on the other side with the chamber 28 through the passage 96. When the valve has moved to the service lap position, as shown in Fig. 11, the auxiliary reservoir will be connected to one side of the diaphragm through the passage $h''$, the cavity $g$ of the graduating valve, the passage $h$, the cavity $i$, the port $j$, into the passage $j'$ and through the storage chamber and passage 135, the other side of the diaphragm 123 receiving pressure through the passage 96, from the chamber 28 which is connected with the train pipe. The valve is normally in its middle position so that normally air can pass freely through the passage 136 into the chamber 122. With a relative increase of pressure in the train pipe the valve will shift toward the left in Fig. 11. In other words, the valve head 131 will close against the seat 128. The pressure on one side of the diaphragm will, therefore, be higher than on the other side until the air under pressure on the side connected to the pipe 96 leaks into the space on the other side of the diaphragm. When the pressure on both sides of the diaphragm has been equalized, the valve will return to its normal position, that is, will open away from the seat 128 and pressure will flow to the storage chamber 65 and thence to the auxiliary reservoir, provided the valve is in lap position. A reduction in train pipe pressure will cause the closing of the valve in the opposite direction. If now, pressure be kept constant in the train line, and air from the storage chamber is passing to the auxiliary reservoir, it will be obvious that the pressure will become less on the storage chamber side than on the train line side of diaphragm 123, until pressure on the storage side has equalized, when the valve will again be opened. When pressure on the storage side has dropped, the valve will close, and when the pressure on both sides has been equalized, it will again open. The valve thus fluctuates until the pressure in the auxiliary reservoir is equal to that in the train line. If train line pressure either rises or falls the valve will close at one end or the other and will not effect release.

Another of the objects of my invention is to provide means whereby the auxiliary reservoir pressure may be vented to the atmosphere if the triple piston and slide valve stick or for any reason fail to resume release position with the increase of brake pipe pressure.

The mechanism whereby this is accomplished is designated G and is shown diagrammatically in Figs. 2 and 3. It consists of a valve chamber, designated 137, divided into two portions by a septum 138 having a centrally disposed opening 139 constituting a valve seat for a valve 141. Bearing against this valve is a spring 145 which forces the valve to its seat. Disposed below the septum 138 is diaphragm 146. The space 154 above the diaphragm 146 and below the valve 141 is connected by a duct 155 to the atmosphere. The space 153 below the diaphragm is connected by a duct or passageway $l$ with the port $k'''$. It will be seen that upon a rise of pressure in the space 153 below the diaphragm the valve 141 will be raised against the force of the very light spring 145, and that any air which may be contained in the space above the diaphragm will be vented through the vent opening 155.

Now, when the parts are in release position, the chamber 153 on the under side of the diaphragm 146 will be connected to the atmosphere through the duct $l$, the port $k'''$, the cavity $e$, the duct $e''$, the cavity $e'''$, and the exhaust cavity $x$. The space on the other side of the valve 141 is connected to the auxiliary reservoir by the duct $l'$.

When the slide valve is in service position, such as shown in Fig. 3, the passage $l$ will be connected through the cavity $e$, the cavity $e'$, the duct $e''$, and the cavity $e'''$ with the passage $m$ leading to the chamber 28 and, therefore, to the train pipe or brake pipe. Now upon an increase in brake pipe pressure to shift the slide valve to release position, if the slide valve does not move, the pressure on the under side of the diaphragm 146 will raise the valve 141 and the auxiliary reservoir air will be vented through the passage $l'$ to the atmosphere by the passage 155. This will decrease the pressure behind the triple piston valve coincidentally with the building up of pressure on the train line side of the piston or in front of it until the difference in pressures will cause a positive movement of the valve to release position. If the triple valve moves to release position as it should with the first rise of brake pipe pressure, the valve 141 will remain closed. If, however, the triple valve fails to move to release position on the first rise of brake pipe pressure, air will be free to pass to the chamber 153 and the pressure in this chamber will overcome the pressure in the auxiliary reservoir and pressure of the spring and the valve 141 will be moved from its seat and air will flow from the auxiliary reservoir to the atmosphere. It will be seen that at this time, therefore, there is rising pressure on the brake pipe side of the triple piston and a decreasing pressure or "blowing down" on the auxiliary side of the triple piston. This will absolutely cause a release of the triple piston, no matter what the defect may be that would tend to cause the triple piston to stay in service position while brake pipe pressure is rising.

Another feature of my invention is to provide a triple valve without the emergency feature which is common in all other standard triple valves known to me and to substitute a quick service instead of the emergency application to avoid any possibility of an undesired emergency application.

With my improved mechanism, I have a serial venting of brake pipe air to the brake cylinder in both the service and quick service positions but the venting of brake pipe air to the brake cylinders in quick service is greater than in ordinary service although not sufficient to cause the triple valves of the entire train to go into quick service position. With my mechanism, when one triple valve goes into quick service position under the action of any of the defects above mentioned, it is practically impossible to get quick service upon all of the triple valves of the train unless a quick service brake pipe reduction is made at the engineer's brake valve or conductor's valve, or unless this reduction is secured by bursting of an air hose. In other words, there must be a heavy brake pipe reduction from some other source than the venting of the brake pipe air to the brake cylinder caused by one triple valve going into quick service position in order to get quick service on all of the triple valves in the train. This is due to the fact that the port $c$ is of such area that it will not vent at any time a sufficient volume of brake pipe air to the brake cylinder to cause the rest of the triple valves to go into quick service position unless the brake pipe pressure is reduced rapidly, either by the engineer or because of bursting of an air hose. No matter what defect may be in the triple valve that would cause it to go into quick service position, none of the other triple valves of the train will go into quick service position for this reason without there being a rapid fall of brake pipe pressure. As before remarked, in ordinary air brake systems and in the standard air brake systems, the shifting of one triple valve to the emergency position will vent such a quantity of brake pipe air that the pressure in the brake pipe will be very quickly reduced and hence the emergency action of one triple valve will cause a serial emergency action of all the other triple valves. This cannot occur with my construction.

In Fig. 16 I show the quick service position of the slide valve. In a quick service application a quick and heavy reduction of air is made at the engineer's valve which causes the slide valve 19 to be thrown to the left in Fig. 4 so far that the stud $9^a$ strikes the buffer 10 and compresses the spring 11. This movement of the valve carries it to the position shown in Fig. 16. It will be seen from Fig. 14 that when the slide valve is in service position, the cavity $a^5$ only slightly overlaps the cavity $a^4$ and that the cavity $c''$ only slightly overlaps the port $a$ of the cavity $a^4$ and only slightly overlaps the port $c$. Thus only a relatively small amount of air can pass from the auxiliary reservoir and from the brake pipe into the brake cylinder. When, however, a quick service reduction is made and the slide valve is carried to the position shown in Fig. 16, the cavity $a^5$ fully overlaps the cavity $a^4$, and the cavity $c''$ fully overlaps both the ports $a$ and $c$ so that a relatively large amount of air can pass from the auxiliary reservoir and train pipe to the brake cylinder. At the same time the slide valve has moved so far over toward the left in Fig. 4 that a port $n$ of a passage $n'$ is brought over the cavity $d'$. This passage $n$ at its outer end is in communication with the air in the auxiliary reservoir chamber 13 and the inner end of the passage turns downward to form the port $n'$. In normal or release position this port $n$ is blanked and the same is true when the parts move to service position, but when the valve moves to quick service position then the port $n$ overlapping the cavity $d$, auxiliary reservoir pressure is carried to the chamber 68 together with air from the storage chamber 97. This rapidly builds up the pressure in the chambers 68 and 85 so as to hold the valve 79 open and the valve 89 closed. The valve 79, of course, remains open until the pressures against the diaphragm 69 have equalized, whereupon the valve closes.

The next mechanism to be considered is the engineer's brake valve and the means connected therewith whereby pressure in the train line and main reservoir may be controlled and the pressure fed to the train line and main reservoir in case of any leakage in the train line. The two main objects of the mechanism which will now be described are to provide means whereby the pressure in the brake pipe may be kept constant after any pre-determined reduction therein is made during the service application of the brakes, and to build up the pressure in the brake pipes to normal or standard pressure when the engineer's valve is in release position.

The mechanism for this purpose is illustrated in Figs. 17 to 28, inclusive. Generally speaking, this mechanism comprises an engineer's brake valve, designated generally O; mechanism for maintaining pressure during release, designated Q; mechanism for maintaining pressure during service, designated R; pump governing mechanism, designated P; a main reservoir S, and an equalizing reservoir T. All of these mechanisms have been fully described in detail in my pending application on engineer's brake valve and automatic feed controlling devices, filed on the 28th day of May, 1914, Serial No. 841,657. Hence in the figures showing these parts of my mechanism, the feed controlling valves have been illustrated diagrammatically.

The first mechanism to be described in order to secure an understanding of my invention is the engineer's brake valve, illustrated in Figs. 17 to 26, inclusive, and also illustrated in the diagrammatic views of Figs. 27 and 28. This comprises a valve body formed of three sections, namely, a base section 160, an intermediate section 161, and a cap section 162. These sections are connected to each other in any suitable manner. The base section is connected to the train line pipe in any suitable manner and is formed with a diaphragm inclosing chamber 163. The chamber 163 is divided into two portions by a diaphragm 164, the space above this diaphragm being designated 165. The chamber 163 below the diaphragm is connected by a passage 166 to a chamber 167 formed in the seat 161$^a$ formed by the upper face of section 161. This chamber 167 is laterally extended, as at 168, (see dotted lines in Fig. 19) and then extends upward and opens through the face of the valve seat, as at 169.

Formed with the valve body is an elbow 170 which is connected to the automatic controlling mechanism R and through which extends a passage 171 which extends laterally at 172 (see dotted lines in Fig. 19) and opens through the face of the valve seat 161$^a$, as at 173. It will be seen from Fig. 19 that these ports 169 and 173 are disposed relatively adjacent to each other.

Formed in the face of the valve seat 161$^a$ is a cavity or chamber 174 which extends downward and then outward to the atmosphere. This cavity 174 has a lateral extension 174$^a$ at its outer wall. Between the port 173 and the axial center of the valve seat, the seat is formed with a cavity 175. Passing entirely through the valve seat and opening at their lower ends into the chamber 165 are the vertical passages 176 and 177.

Formed with the valve body is the elbow 178$^a$ which is operatively connected to the hand controlled pressure maintaining mechanism, designated Q. This elbow opens into a vertical passage 179 which opens into the upper end of the valve casing formed by the cap 162.

Figure 22:
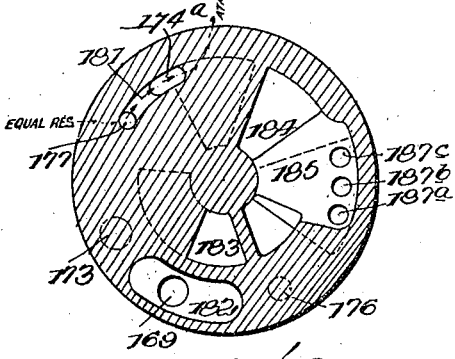
Fig. 22 is a like view to Fig. 21, but showing the position of the rotary valve at "service"
Figure 23:
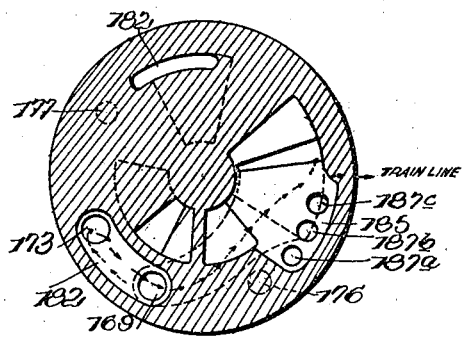
Fig. 23 is a like view to Fig. 22, but showing the valve at "running service" position.

Resting against the face of the valve seat is a circular disk-shaped rotary valve 180, shown in detail in Fig. 20. This valve is adapted to be rotated by a handle, as will be later described. The under face of the valve is formed with a cavity 181 arcuate in form and adapted to register and co-act with the equalizing port 177 and with the extension 174$^a$ of the cavity 174, as shown in Fig. 22, or with the port 173 in the quick service position of the valve. At the same distance from the center of the valve is a cavity 182 which is adapted to register with the ports 173 and 177 in the release and holding position of the valve, as shown in Fig. 21, or to register with and connect the ports 169 and 173 in running service position, as shown in Fig. 23.

Disposed radially inward from the cavity 182, which extends only about half way into the valve 180, is a segmental-shaped port 183 which extends entirely through the valve and which co-acts with the cavity 175 when the parts are in release position, as illustrated in Fig. 21.

Figure 25:
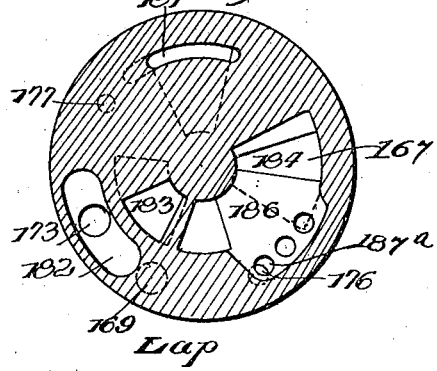
Fig. 25 is a like view to Fig. 24, the rotary valve being shown at "lap" position.
Figure 26:
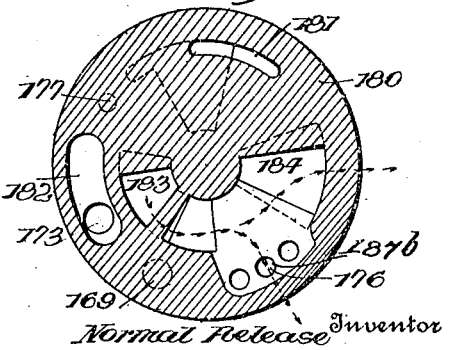
Fig. 26 is a like view to Fig 24, but showing the valve at normal release position.

Also formed in the under face of the valve and diametrically opposed to the cavities 181 and 182, is a relatively large arcuate cavity 184. This cavity is segmental in general form but is radially extended for a portion of its length at its middle, as at 185. The under face of this cavity 184 is crossed by a radially extending web 186 which is provided with three ports 187$^a$, 187$^b$ and 187$^c$. These three ports are adapted in various positions of the valve to register with the port 176, as shown in Figs. 21, 25 and 26.

The valve may be oscillated through a pre-determined angular extent by means of any suitable handle. For instance as illustrated the valve is provided in its upper face with a square recess 188, and passing through the cap 162 is a stem 189, the lower end of which is formed with a relatively wide disk 190, the under face of which carries a square stud 191 which engages in the recess 188. The upper end of the stem 189 is reduced and squared for the reception of the eye 192 on a handle 193, the handle being held in place by the usual nuts 194. The upper face of the cap is provided with certain stops with which the handle 193 is adapted to engage as will be more fully described, these stops permitting the handle to be turned through an arc of approximately 90°.

Entering the body 160 through the side wall thereof is a pipe 195 which has a small extension 196 which opens into the chamber 165. This branch 195 is connected to a pipe 197 leading to the equalizing reservoir, as shown clearly in the diagrammatic views, Figs. 27 and 28.

Disposed within the chamber 165 is an interior cap or spider 198 which is screw threaded for engagement with the walls of the chamber 165 and is perforated at a plurality of points, as at 199. This cap is formed with a recess 200. Extending upward from the diaphragm 164 is a stem 201 which is attached to the diaphragm 164 in any suitable manner and which is surrounded by a spring 202, this spring acting to force the diaphragm downward, as illustrated in Fig. 17. The diaphragm carries depending from it in the chamber 163 the valve stem 203. This seats in a valve seat 204 which is disposed in a socket 204$^a$ formed at the intersection of the chamber 163 with the train line pipe. The valve seat is connected by a duct 205 to a pipe 206 which leads to the atmosphere and which constitutes the exhaust pipe or vent. In the side of the valve socket 204$^a$ is a port 207 which communicates with the chamber 163. It will now be obvious that, when the valve 203 is lifted, the pressure in the chamber 163 and, therefore, the pressure in the train pipe will be vented through the pipe 206. The diaphragm 164 is held in place by means of a ring 208 which in turn is held in place by the spider 198, as clearly shown in Fig. 17.

The next mechanism to be described is the mechanism designated Q used for maintaining any desired pressure in the train pipe when the brakes are released. Referring now to Figs. 27 and 28, it will be seen that this mechanism comprises a body 209 formed intermediate its ends with a septum 210 having a central perforation provided with a valve seat 211. Co-acting with this valve seat is a valve 212 which, when it is raised, closes against the valve seat and which, when depressed, permits the passage of air through the valve seat. Extending upward from this valve is a stem 213 which bears against a diaphragm 214 against which operatively bears a spring 215 regulated by a hand wheel 220. The spring 215 resists any upward movement of the diaphragm, and it will be obvious that the tension of this spring may be adjusted by rotating the hand wheel 220 in one direction or the other.

The space immediately below the septum 210 is designated 222 and this space is closed at its lower end by means of the diaphragm 223 which is connected to the valve 212. Disposed in the enlarged lower portion of the valve body 209 is a diaphragm 227 which is approximately twice the size of the diaphragms 223 and 214. Thus the three diaphragms 227, 223 and 214 are connected to move together by the stem 213. It will be seen that below the diaphragm 227 there is a space 233 which communicates with the train line by pipes 256 and 257. The space below the diaphragm 223 is designated 235. The space below the diaphragm 214 is designated 236. The space 235 communicates with the atmosphere.

Preferably formed integral with the body 209 is a valve chamber 237, illustrated diagrammatically in Fig. 27. Crossing the valve chamber and dividing it into two parts is a diaphragm 239. The space above the diaphragm 239 is designated 240 and the space below 241. Opening into the space 236 is a duct 246 which connects the chamber 240 with the space immediately below the diaphragm 214 and above the valve seat 211. The space 241 is downwardly extended, as at 247, and connected to the space 222 between the diaphragm 223 and the valve seat 211 by means of a duct 249.

Mounted upon the diaphragm 239 is a valve 250 which seats against the valve seat 248. A spring 252 acts to force the valve to its seat. When, however, the pressure is reduced on the upper side of the diaphragm 239, it will be obvious that the valve 250 will be lifted from its seat against the force of the spring 252. Entering the chamber 241 below the diaphragm 239 is the pipe 254 which leads from the main reservoir, as shown in Figs. 27 and 28. Extending from the chamber 247 below the valve seat 248 is a pipe 255 which connects to the elbow 178$^a$ on the brake valve.

The pipe leading from the engineer's valve to the train line pipe A is designated 256. The connection of this pipe to the brake valve has been heretofore described. This pipe connects at one end to the brake valve and at the other end to the train line A. The space 233 below the lower end of the diaphragm 227 is connected to the pipe 256 by a pipe 257. It will now be obvious that there will be main reservoir pressure in the space 241 below the diaphragm 239 and that there will be train line pressure in the space 233 below the diaphragm 227.

Before stating the operation of the mechanism, I will describe the construction of the mechanism R for maintaining pressure in the train line during the service application of the brakes. The mechanism for this purpose comprises two conjoined valve chambers, one designated 258 and the other 259. The valve chamber 258 is divided into two parts by the septum 260 which is formed at its center with a valve seat 261. Above the valve seat is disposed a diaphragm 262. The space above the diaphragm may be designated 267, while the space below the diaphragm may be designated 268, and the space below the septum 260 may be designated 269. A coil spring 273 urges the diaphragm downward.

Mounted upon and depending from the diaphragm 262 is a valve 274 which closes upward against the valve seat 261. A spring 277, which is lighter than the spring 273, bears upward against the valve 269. It will be obvious that, when the pressure in the space 268 is less than a certain amount, the air pressure and spring 273 will force the diaphragm downward and unseat the valve 274, and when there is sufficient pressure in the chamber 268, the valve will be raised. The space 267 above the diaphragm 262 is connected by a pipe 197ª to the pipe 197 which leads to the equalizing reservoir T.

The valve casing 259 is divided into two chambers 278 and 279 by a diaphragm 280 having a perforation 280ª. The upper chamber 278 is enlarged to form a chamber 285 which is connected to the pipe 170. Disposed between the chambers 278 and 285 is a valve seat 284, with which a valve 286 coacts, this valve being mounted upon the diaphragm 280 and having a stem 288 which passes downward and is fixed to the diaphragm. The valve 286 is held to its seat by a spring 287. The chamber 269 is connected to the chamber 279 by means of a passage 290, while the chamber 285 is connected to the space 268 below the diaphragm 262 by a passage 289. The pipe 291 extends from the space 278 to the pipe 255.

The pump and governing mechanism is practically the same as that found in all standard equipments. The pump is not shown, but the steam pipe leading to the pump is designated 292, and passage of steam from the steam generator to the pump is controlled by means of the valve 293. The pump governing mechanism P comprises the low pressure head 294, and the high pressure head 295. Each of these pressure heads or chambers has a valve seat 296 at its lower end leading into a relatively small chamber connected by a pipe 297 to a chamber 298 within which is disposed a piston 299 connected by a stem to the valve 293. A spring 300 acts to force this piston upward. The upper end of the chamber 298 is provided with an atmospheric vent 301 to counteract compression upon raising of the piston 299. Disposed in each of the chambers or pressure heads 294 and 295 is a valve 302 closing against the corresponding valve seat. Each valve is connected to a diaphragm 303 supported in any suitable or usual manner. Disposed above the diaphragm 303 in the chamber or low pressure head 294 is a spring 304 which bears downward against the diaphragm 303 and holds the corresponding valve 302 to its seat. This spring has a tension equal to twenty pounds or more. Disposed in the high pressure head or chamber 295 is a spring 305 which exerts a pressure of one-hundred and ten pounds against the diaphragm 303, so as to hold the valve connected thereto closed. From the high pressure head 295 extends a pipe 306 which connects to the pipe 254 and thus connects to the main reservoir, while from the chamber 294 or low pressure head below the diaphragm 303 extends a pipe 307 which connects to the pipe 254. From the upper portion of the chamber 294 above the diaphragm 303 therein extends a pipe 308 which connects to the pipe 255. Thus the under side of the diaphragm in the chamber 294 is at all times filled with air at main reservoir pressure, while the pipe 308 is filled, when the brakes are released with air at train line pressure.

The low pressure head 294, as will be hereinafter seen, operates to control the pump in release or release and holding position of the engineer's valve, while the high pressure head operates during service position. The low pressure head is controlled by the pressure of the train line and main reservoir, while the high pressure head is controlled by the pressure of the main reservoir. It will be obvious that, when the pressure below the diaphragm in the chamber 295 increases beyond the force exerted by the spring 305, the diaphragm will be forced upward and air will be admitted through the chamber 295 to the upper end of the chamber 298, causing the closing of the valve 293 and the cutting off of steam to the pump. When the pressure in the main reservoir is one-hundred and ten pounds or less, however, the spring 305 will cause the valve to close, and, if the valve in the chamber 294 is also closed, then the spring 305 will cause the valve 293 to open, allowing the passage of steam to the pump until such time as the pressure again increases in the main reservoir to a point above one-hundred and ten pounds.

It will also be obvious that the space beneath the diaphragm of the chamber 294, inasmuch as it is connected to the pipe 254, will have in it pressure equal to the pressure in this pipe. With a main reservoir pressure of one-hundred and ten pounds, the pressure in the pipe 254 will be one-hundred and ten pounds, and, therefore, the pressure on the under side of the diaphragm in the chamber 294 will be one hundred and ten pounds. The normal train line pressure is seventy pounds, and, under all circumstances, no matter how high the pressure in the pipe 254 is raised, there will always be twenty pounds difference between the train line pressure and the pressure in the pipe 254 with the brake valve in release position. The spring 304, exerting a force equal to twenty pounds, it is obvious, that, if the pressure in the pipe 308 is seventy pounds and the pressure in the pipe 307 is ninety pounds, the pressure below the diaphragm will, equal the pressure of air and the pressure of the spring above the diaphragm and the valve of the chamber 294, be held closed. If, however, the pressure in the pipe 307 increases beyond ninety pounds, then the diaphragm will be raised, raising with it the valve, and air will be admitted to the chamber 298, causing the valve 293 to close.

Inasmuch as this pump governor is of the ordinary duplex type, which is well-known in the art, it is not believed that any detailed view of the pump governor will be required.

The operation of my invention is as follows:

While the train is standing still or the valve is in release position, the pressure in the chamber 233 holds the valve 212 closed. When the pressure in the train line falls, due to any cause, the pressure also falls in the chamber 233 and the valve 212 opens. This allows air from the space 240 to escape into the space 222 above the diaphragm 223, and thence to escape by the duct 249 to the chamber 247, and thus to the pipe 255, and thence to the train line through the "rotary" or engineer's brake valve by the course shown by arrows in Fig. 27. As the air passes quickly from the chamber 240, there will be greater pressure on the under side of the diaphragm 239 than on the upper side. As a consequence, the valve 250 will open and main reservoir air passes to pipe 255, which, as before stated, is connected to the train line through the engineer's valve. The pipe 257 has in it train line pressure, and, when the pressure of the train line builds up and the pressure in the chamber 233 builds up sufficiently to overcome the spring 215, which, we will say, is set at seventy pounds but which may be set at any desired pressure, the diaphragm 227 will be raised and the valve 212 will close. This will prevent the escape of air through the duct 246 and, as a consequence, air will pass through the perforation 239ª in the diaphragm 239 and build up behind the diaphragm 239 until the pressures on opposite sides of the diaphragm 239 are equal, whereupon the valve 250 will close, cutting off pressure from the main reservoir. In the release and holding position of the engineer's valve (which is the position shown in Fig. 27) exactly the same operation occurs.

Thus it will be seen that as soon as the train line pressure drops below seventy pounds (if the controlling valve spring 215 is set for this pressure) the train line is fed, and as soon as the pressure in the train line rises to seventy pounds pressure or to any pre-determined pressure, the feed of air from the main reservoir is cut off. During this time the pressure is constantly kept at seventy pounds in the equalizing chamber T and in chamber 267, and above the diaphragm 262. Now, when a service reduction is made (assuming that the normal pressure in the train pipe is seventy pounds) the pressure in the chamber 267 is vented, together with air in the equalizing chamber according to the reduction desired. This air is vented through the passage 174 to the atmosphere and the amount of air so vented or reduction of pressure so made in the equalizing chamber and in the chamber 267 is indicated by the gage connected to the upper end of the pipe 197. The venting of the pipe 197 is accomplished by the venting the air in the chamber 165, and thus pressure in the chamber 165 is reduced so as to reduce the pressure on the upper side of the diaphragm 164. This will cause lifting of the valve 203 and the air in the train pipe is vented. The reduction in pressure in the chamber 267 immediately causes the valve 274 to close, this valve having heretofore been held open by the spring 273 and air pressure. This prevents escape of air from below the diaphragm 280, and, as a consequence, the air which passes through the pipe 291 to the upper side of the diaphragm 280 will equalize through the port in the diaphragm and will cause valve 286 to close, preventing the passage of main reservoir pressure to the train pipe by way of the pipe 170, the ports 169 and 173 and the cavity 182.

The reduction of the train line pressure immediately reduces pressure in the controlling chamber 233 to a point below seventy pounds, and this causes the spring 215 to open the valve 212. This releases air above the diaphragm 239 and the main reservoir pressure opens the valve 250, permitting air from the main reservoir to flow to the pipes 255 and 308. This pipe 255 is, however, in service as well as running service position blanked, as shown in Fig. 27.

After reduction is made in the equalizing chamber T and the chamber 267, the brake valve 180 is shifted to running service position which laps the ports 176 and 177, as shown in Fig. 28, holding the air in the equalizing chamber and the chamber 267 at sixty-five pounds (assuming that a five pound reduction has been made from a train pipe pressure of seventy pounds). If now the air in the train line rises above sixty-five pounds, the back pressure in the pipe 170 will create pressure on the under side of the diaphragm 262 which will cause the valve 274 to close. This will prevent escape of air from below the diaphragm 280, the main reservoir pressure will pass through the opening 280ª in the diaphragm 280 and will raise the pressure below the diaphragm 280 until the valve 286 is closed. As soon as this valve is closed, passage of air to the train line will be cut off. The spring 273 offsets the main reservoir pressure against the lower end of the valve 274, tending to hold the valve to its seat.

If now, on the other hand, the pressure, in the train line drops below sixty-five pounds through leakage in the train pipe, then the pressure in the chamber 268 will be less than sixty-five pounds and the air pressure and pressure of the spring 273 will cause the valve 274 to open. This allows the air below the diaphragm 280 to escape relieving the pressure below the diaphragm, and the excess pressure above the diaphragm will cause the valve 286 to open, permitting passage of air from the train pipe until its pressure is built up to sixty-five pounds, whereupon the valve 286 will again be closed.

The operation of the pump governor in connection with the parts which have heretofore been described is as follows:

In Fig. 27 the parts are shown in the position when pressure is being built up to release the brakes. Air is, therefore, flowing from the main reservoir and from the pipe 255. Inasmuch as the main reservoir pressure is reduced below one-hundred and ten pounds the valve in the high pressure head 295 is entirely closed. Under these conditions, the pipes 307 and 308 will both be in communication with the main reservoir and the air pressures against opposite sides of the diaphragm of the low pressure head will be equal. The spring of the low pressure head will, therefore, maintain its valve closed and the spring of the pump governor will hold its valve in open position. Steam, will, therefore, pass to the pump and cause it to operate to compensate for the loss of pressure in the main reservoir and this action of the pump will be continued until such pressure becomes high enough to open the valve of the high pressure head and permit passage of air from the main reservoir to the pump governor to close the valve of the latter.

When the pressure in the train pipe and in the chamber 233 rises to seventy pounds (assuming that this is the pressure which is being kept in the train pipe) it closes the valve 212 which closes the valve 250 and divides the pipe 254 from the pipe 255. With the valve 250 closed, the pressure in the pipe 308 immediately equalizes with the train line pressure at seventy pounds. There is, therefore, seventy pounds pressure in the chamber 294. Upon a stoppage of flow from the pipe 254, it is plain that there will be a greater pressure in the pipe 307 than in the pipe 308, and thus greater pressure in the lower end of the chamber 294 than in the upper end thereof. This will cause the valve in the chamber 294 to open, stopping the pump. The pump will remain at rest until the pressure in the main reservoir and the pipes 254 and 307 (by leakage in train pipe) is reduced slightly below ninety pounds, whereupon the spring above the diaphragm will cause the valve in the chamber 294 to again close, and the pump will once more operate. Just so long as the brakes are released, pressure will be carried in the main reservoir equal to that in the chamber 294 plus the spring, thus allowing the pump to work against a low pressure during the time that the brakes are released. Inasmuch as the brakes are released for the greater portion of the time, it is obvious that the pump should work only against a low pressure at such a time, as otherwise the pump would overheat.

The pump must work in running service position to build up a high pressure in the main reservoir so as to have sufficient air to secure release and recharging. In running service position the upper and lower ends of the chamber 294 both contain air at main reservoir pressure, and hence the spring causes the closing of the valve in the chamber 294, cutting out the low pressure head. As the main reservoir pressure is low at this time, namely ninety pounds, the pump will immediately commence to operate until the pressure in the main reservoir equals the pressure of the spring in the high pressure head. If this spring is set at one-hundred and ten pounds, then the pressure in the main reservoir will be built up to one-hundred and ten pounds and the pump governor will hold the pressure in the main reservoir at one-hundred and ten pounds during the time the brakes are set. As soon as release is effected, the pressure in the main reservoir will through leakage in the system again drop to ninety pounds, as previously stated, the pump being then controlled by the low pressure head.

As illustrated in my co-pending application upon this engineer's valve and feed controlling valve, the springs 304 and 305 of the pump governor are adjustable. The spring 304, as previously stated, is always kept at such tension as to exert a pressure of twenty pounds upon its diaphragm, but the tension of the spring 305 is adjusted to suit the amount of pressure it is desired to maintain in the main reservoir during braking application, whatever that may be.

As will be seen by reference to Figs. 21 to 26 there are six positions of the valve 180. Fig. 26 shows the valve 180 at normal release position. This position of the valve causes a slow rise of pressure in the train line and an unretarded release of the brakes as the automatic retaining mechanism (described and illustrated in detail in my application on triple valve, previously referred to) is not caused to operate. This normal release is used in short trains. In this position air from the pipe 255 is passed through the pipe 178 into the upper part of the cap 162 and down through the port 183 into the cavity 175, thence into the cavity 184, and thence through a relatively small port opening in the chamber 167 and into the train line. Air is also passing from the cavity 175 through the ports 187$^b$ and 176 into the chamber 267 and into the equalizing reservoir T. It will be seen by reference to Fig. 26 that the port 173 opens into the cavity 182, but that this cavity does not connect with any other port, and that, therefore, passage of air from the pipe 170 is cut-off.

The release and holding position of the valve, which is shown in Fig. 21, is the same as the normal release position, except that with the valve in release and holding position a quick rise of pressure is caused in the train pipe instead of a slow rise of pressure, and hence the automatic retaining mechanism above referred to, is operated and holds the brakes on the head end of the train. The cavity 182 very slightly laps the port 177 leading into the equalizing reservoir, and partially laps the port 173 leading from the controlling or feed valve R. Thus the chamber 165 is rapidly charged with air from the automatic feed control valve Q and from the feed valve R through the ports 176 and 177, to correspond with the quick rise of pressure in the chamber 163, and prevent the rise of the diaphragm 164.

In service position communication is established between the equalizing reservoir and chamber 267 and the atmosphere by means of the cavity 181, which vents a certain amount of air from the equalizing reservoir and chamber 267 to the atmosphere by way of the chamber 174.

After service reduction has been made by moving the valve to the service position shown in Fig. 22, the valve is then moved to the running service position. This cuts off the passage of air from the equalizing reservoir and the chamber 267 by way of the pipe 197, and, traps the air in the equalizing reservoir and in the chamber 267. This position of the valve opens communication between the automatic control valve casing 259 and the train line, through the cavity 182 which connects the ports 173 and 169, as shown in Fig. 23.

Figure 24:
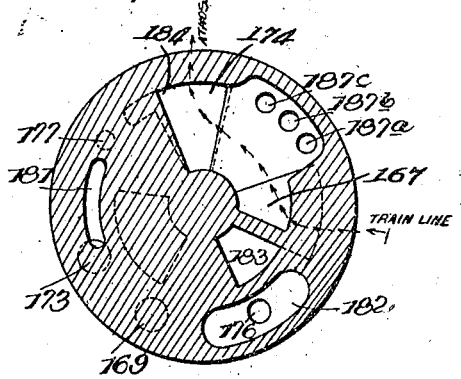
Fig. 24 is a like view to Figs. 21, 22 and 23, but showing the valve at "quick service" position.

If, for any reason, the controlling valve mechanism contained in the chamber 258 does not work, with the valve in service lap position so that the train line pressure is being built up to cause a release the valve is shifted to lap position. This cuts off communication from the main reservoir of the train line, as will be clearly observed from Fig. 25, and the brakes will be held. This is also done if the train breaks in two, as otherwise the main reservoir pressure would be immediately vented at the break in the train pipe.

Where quick service is desired, the valve is turned to the position shown in Fig. 24, so as to establish a relatively large area of communication between the train line and the atmosphere through the passage 174 instead of opening a relatively small passage through the vent 206 which is accomplished in ordinary or normal service.

It will be particularly noted that the feed valve mechanism, designated Q, operates to regulate the pressure in the train pipe at release and holding position to maintain constant pressure in the train pipe, while the valves are in release position, and that the pressure feeding mechanism, designated R, is for the purpose of maintaining a constant pressure in the train pipe during service and at any reduction which may be made.

In double heading with the present equipment, it is necessary that the main reservoir and pump mechanism on the following engine or engines be cut out so that the control may be entirely in the hands of the engineer of the head engine. One of the objects of my invention is, as previously stated, to provide means whereby the use of the pumps and the main reservoirs of the second or third engines may be secured, and the operation of these instrumentalities be under the control of the engineer on the head engine, and to provide means whereby a reduction in the train line pressure made by the engineer of the first engine will automatically cut out the feed valves of the following engine or engines, thus preventing pressure being fed to the train line through the brake valves and allied parts of the following engines which would nullify the effects of such reduction and whereby a rise of pressure in the train line will automatically act to cut in the feed valves again, so that advantage may be taken of the main reservoir of each following engine and of the pump mechanism thereof. The mechanism whereby this is attained is as follows:

It will be seen from Figs. 27 and 28 that the pipe 197 is connected with the pipe 256 by a pipe 309, in which is disposed a valve 310 or cock so formed that, when turned in one direction, communication will be established through the passage or pipe 309, and that, when turned in the other direction, this communication will be cut off. It will be obvious from Figs. 27 and 28 that, when the valve is turned to the position therein shown, any air which passes to the chamber 267 and to the equalizing reservoir T must pass through the engineer's valve.

In double heading, however, the valves 310 on the following engines are turned to open the passages through the pipes 309. As a consequence this chamber 267 on the engine succeeding the head engine will be connected direct to the train pipe. It will be seen now that a reduction of pressure in the train pipe will cause a reduction of the pressure in the chamber 267. The engineer's brake valves of the second and third engines are carried in running service position. This, as before explained, will prevent passage of air from behind the diaphragm 280 and pressure will build up behind this diaphragm through the perforation 280$^a$ as a consequence. At the same time, the pressure in the chamber 233 is reduced below the adjustment of the spring 215, and the spring causes the valve 212 to open, which reduces the pressure in the chamber 240 below the main reservoir pressure. This causes the valve 250 to open and remain open so long as the pressure in the chamber 233 is reduced below the adjustment of the spring 215. This causes the entire valve mechanism Q to be cut out, or, in other words, permits the air to pass freely through it. This allows main reservoir air to pass though the pipe 308 into the upper end of the low pressure head 294. This automatically cuts out the low pressure head 294 of the governor and the pumps of the engines must, therefore, operate to build up pressure in the corresponding main reservoirs equal to the adjustment of the high pressure heads during brake application. Upon a release of the brakes, however, the pressure in the train line will rise, and this will be transmitted through the cut out cock 310 to the diaphragm 262, and through the pipe 257 to the diaphragm 227, causing a depression of the diaphragm 262 and an opening of the valve connected thereto. This will permit the escape of air from behind the diaphragm 280 and main reservoir pressure, will, therefore, force the diaphragm downward, opening the valve 286 and allowing air from the main reservoir to pass to the pipe 170.

The next mechanism which is to be considered is the means for operating the engine brakes of the train by air from the main reservoir, and the provision of means whereby the pressure applied to the engine brakes shall at all times be in correspondence with the pressure in the main reservoir and train pipe, so that, if there is any increase of pressure in the main reservoir, there shall be a corresponding increase of pressure in the engine brakes and train pipe. This mechanism above referred to is illustrated in Figs. 29 to 36, inclusive, and in these figures 311 indicates the upper part of the valve casing formed with a valve seat 312, the base of the valve casing being designated 313.

At one end of the section 313 is disposed a pipe 314 opening into the valve casing by a port 315 which extends transversely to the length of the casing. Adjacent the other end of the casing, but spaced therefrom, is a port 316 which is also transversely extended. Disposed adjacent the port 316, but intermediate this port 316 and the port 315, are the transversely alining ports 317 and 318. A pipe 319 enters the base 313 and connects with the port 317, while the pipe 320 enters the base 313 and connects with the port 318. Entering the base 313 and connecting with the port 316 is a pipe 321. Sliding upon the seat 312 is a valve 322 having in its face a cavity 323 and a solid portion 324. This slide valve is provided with ears 325, and a pin 326 connects the slide valve with an arm 327 mounted on a sleeve 328. This sleeve is held in engagement with an arbor 329 which has a handle 330. This handle operates over a rack 331 whereby the handle may be held in any adjusted position.

The auxiliary reservoir designated I, is of the usual construction, and is connected to any usual or ordinary triple valve H, this triple valve having been previously described. The triple valve casing is connected to the brake cylinder B by the usual pipe 61. The main reservoir is designated S.

The port 316 is connected by the pipe 321 to the auxiliary reservoir I, while the port 318 is connected by the pipe 320 to the pipe 61. The pipe 319 leads from the port 317 to the atmosphere. Extending from the pipe 320 is a branch 332 which opens into the governing valve chamber 333. Extending from the other end of this valve chamber is a pipe 334 opening into the main reservoir S. Adjacent the last-named end of the chamber 333 is a septum 335 having therein a valve seat 336. The governing chamber is enlarged at its end opposite the valve seat 336, as at 337, and disposed within this enlarged portion is a diaphragm 339. Disposed in the contracted portion of the chamber 24 is a diaphragm 340 which is approximately one-half the size of diaphragm 339. Co-acting with the valve seat 336 is a valve 341 which is formed with a stem 342 engaging the diaphragm 340. This stem engages against the diaphragm 339. These diaphragms 339 and 340 are linked together for common movement. From the port 315 of the casing 311 extends the pipe 314 which opens into the chamber 333 at a point midway between the septum 335 and the diaphragm 340.

The operation of the mechanism heretofore described is as follows:

In the lap and running position of the parts, as shown in Fig. 35, the imperforate portion 324 of the slide valve 322 covers the ports 316, 317 and 318. Hence there is no flow of air to the atmosphere from the auxiliary reservoir and brake cylinder through either of the ports 316 or 318, and no flow from the main reservoir through the port 316 to the auxiliary reservoir.

Upon a quick service application, the slide valve 322 is shifted to uncover the port 316, as shown in Fig. 34, and air flows from the main reservoir to the auxiliary reservoir by way of the pipe 334, the chamber 333, the pipe 314, the port 315, the chamber of the valve casing 311, the port 316 and the pipe 321. From the auxiliary reservoir air flows into the brake cylinder by the pipe 61. As soon as there is 45 pounds in the brake cylinder (assuming that there is 90 pounds main reservoir pressure), the back pressure in the pipe 320 and the branch 332 will cause sufficient pressure to be exerted on the diaphragm 339, to close the valve 341 and cut off flow of air to the auxiliary reservoir. At this time the auxiliary reservoir pressure will be 75 pounds more or less. This is approximately five pounds greater than the pressure in the train line. After the valve 341 closes, this excess pressure of approximately 5 pounds will continue to flow to the brake cylinder until the pressure in the auxiliary reservoir is slightly less than in the train line. Then the triple piston and graduating valve will move to lap position and close communication between the auxiliary reservoir and the brake cylinder.

The quick service is secured by shifting the valve 322 so as to entirely open the port 316, thus giving a rapid flow of air from the main reservoir pass to the auxiliary reservoir. To secure a quick release, as illustrated diagrammatically in Fig. 33, the valve 322 is shifted so that the cavity 323 connects both of the ports 316 and 318 with the atmosphere by the port 317. This connection vents air both from the auxiliary reservoir and the brake cylinder and causes the triple valve to return quickly to its normal release position (in which position the brake cylinder is connected to the atmosphere through the triple slide valve as usual) and also vents the air behind the diaphragm 339, allowing the valve 336 to open, which admits main reservoir air to the top of the slide valve 322.

In order to secure a graduated service application, the handle 330 is oscillated to shift the valve 322 back and forth from lap and running position to quick service position.

If it is desired to apply the engine brakes at 10 pounds pressure, then as soon as the gage which is connected to the brake cylinder (but which is not shown in the drawings) shows that the pressure in the brake cylinder has risen to 10 pounds, the straight air brake valve 322 is shifted back to running lap position, that being the position shown in Fig. 35. The admission of main reservoir air pressure to the auxiliary reservoir shifts the triple valve to service position in the same manner as if a train pipe reduction had been made. As soon as the straight air brake valve 322 is shifted to running lap position, the graduating valve of the triple valve will also shift to lap position, and the pressure in the brake cylinder will be trapped by this movement of the triple valve and will be proportional to the amount of air previously admitted to the auxiliary reservoir from the main reservoir.

When a graduated release is about to be made, the triple valve is in lap position, and, consequently, communication is cut off between the auxiliary reservoir and the brake cylinder.

Now upon a shifting of the straight air brake valve 322 to secure a gradual release, the air in the brake cylinder is allowed to exhaust but the air from the auxiliary reservoir cannot exhaust inasmuch as the port 316 is covered by the imperforate portion 324 of the valve 322. When nearly all the pressure is exhausted from the brake cylinder, the valve 322 is shifted to the quick release position which vents auxiliary pressure and causes the triple piston and slide valve to return to their release position.

Now it will be obvious that the pressure in the brake cylinder will depend upon the pressure in the main reservoir at the time when the brakes are fully applied. We have assumed a pressure of 90 pounds in the main reservoir which will give 45 pounds pressure in the brake cylinder, but, if the main reservoir pressure be raised to 110 pounds, the brake cylinder pressure will be increased accordingly to 55 pounds.

It will be seen from what has gone before that I provide a straight air brake valve the actuation of which will cause an operation of the triple valve exactly as if the train line pressure had been reduced or raised so that the triple valve of the engine may be operated without either reducing or increasing the pressure in the train line. It will further be seen that my improved mechanism will give either a graduated service application or a quick service application and also cause either a graduated release or a quick release. Furthermore, this straight air brake may be operated when there is no brake pipe pressure as it is not dependent upon brake pipe pressure and may be either released or applied at will. Furthermore, it requires no modification of the triple valve, and the triple valve on the engine operates in precisely the same way as the triple valve on the remainder of the cars in automatic brake application. One triple valve is all that is required for the engine, tender and engine truck brakes.

One of the great advantages of my straight air mechanism is that I do away with the use of a double check valve by causing the triple slide valve to be shifted upon a straight air application to thereby close the triple valve exhaust port.

As a result of this all of the advantages incident to the use of the triple valve are secured.

It is to be particularly noted that the wheel 220 which controls the adjustment of the spring 215 not only controls thereby the train line pressure but also controls the main reservoir pressure (through the low pressure head) at release. This one wheel (which is located in the engineer's cab and in convenient reach of the engineer) does the work of controlling the low pressure head of the governor without the necessity of going out on the running board to adjust the pump governor itself which is necessary with the present constructions.

Having thus described the invention what is claimed as new, is:—

1. In an air brake system, the combination with a train pipe, a triple slide valve, a storage chamber, a brake cylinder pressure operated means for controlling the feed of train pipe air to the brake cylinder, said means being controlled by pressure in the storage chamber, of means for admitting main reservoir air behind the piston of the slide valve to throw said slide valve to quick service position, the slide valve being provided with ports adapted to establish relatively large communication between the feed controlling means and the brake cylinder upon a movement of the slide valve to quick service position, and with a port adapted to establish communication between the train pipe and the feed controlling means whereby to cause full opening of the feed controlling means thereby to permit the passage of a relatively large amount of air to the brake cylinder.

2. In an air brake system, a train line, means for building up pressure and retaining the pressure in the train line at a predetermined degree above a normal degree of pressure therein, a triple slide valve, an auxiliary reservoir, a brake cylinder and means coacting with the triple slide valve for controlling the passage of said excess pressure to the brake cylinder.

3. In combination with means controlling the pressure in the train line, adjustable means for feeding pressure from the main reservoir to the train line and keeping the pressure in the train line at a predetermined degree, means for feeding the train pipe pressure directly to the brake cylinder upon a movement of the triple slide valve to service position, means operated by a rise of pressure in the train line for opening the said feed valve until the pressure in the train line and brake cylinder are equalized, and means for cutting out or cutting in said last named means.

4. In an air brake system, the combination with a train pipe, a triple valve, a storage chamber and a brake cylinder, of means controlled by pressure in the storage chamber for controlling feed of train pipe air to the brake cylinder, the venting of air from the brake cylinder to maintain a predetermined pressure therein, and means for controlling the pressure in the storage chamber to thereby control the pressure in the brake cylinder, said means including adjustable means for feeding air to the train pipe.

5. In an air brake system, a train line, adjustable means for building up and maintaining pressure in the train line either at normal or at a pressure in excess of normal, depending upon the adjustment of such means, a triple slide valve, an auxiliary reservoir, a brake cylinder, and means co-acting with the triple slide valve for controlling passage of pressure to the brake cylinder, said means maintaining normal pressure in the brake cylinder by supplying pressure in the brake cylinder by supplying air thereto or venting it therefrom, if the pressure in the train line is normal and maintaining a predetermined excessive pressure in the brake cylinder proportionate to any predetermined excessive pressure in the train line.

6. In an air brake system, the combination with a brake cylinder, of means for supplying air to the brake cylinder, means for maintaining a predetermined pressure in the brake cylinder, and means co-acting with the last mentioned means for maintaining a pressure in the brake cylinder above such predetermined pressure.

7. In an air brake system, the combination with a brake cylinder, of means for supplying air to the brake cylinder, means for maintaining a predetermined pressure in the brake cylinder, means co-acting with the last mentioned means for maintaining a pressure in the brake cylinder above such predetermined pressure, and means for rendering the means maintaining the excessive pressure in the brake cylinder inoperative.

8. In an air brake system, a train line, means for building up pressure and retaining the pressure in the train line at a predetermined degree above normal pressure therein, a triple valve, an auxiliary reservoir, a brake cylinder, and means operable only under abnormal train line pressure co-acting with the triple valve for controlling the passage of excess pressure from the train line to the brake cylinder, said means in turn being controlled by the abnormal pressure in the train line.

9. In an air brake system, the combination with a train pipe, a triple valve, a brake cylinder, and means for making predetermined reductions in train pipe pressure to cause action of the triple valve to create corresponding air pressures in the brake cylinder, of a storage chamber, and means controlled by pressure in the storage chamber for controlling feed of train pipe air to the brake cylinder to maintain a predetermined pressure therein in excess of the normal pressure for the train pipe reduction made.

10. In an air brake system, the combination with a train pipe, a triple valve, a brake cylinder, and means for making predetermined reductions in train pipe pressure to cause action of the triple valve to create corresponding air pressures in the brake cylinder, of a storage chamber, means controlled by pressure in the storage chamber for controlling feed of train pipe air to the brake cylinder to maintain a predetermined pressure therein in excess of the normal pressure for the train pipe reduction made, and means for controlling the pressure in the storage chamber to thereby control the pressure in the brake cylinder.

11. In an air brake system, a train pipe, means for creating excess pressure in the train line to predetermined degrees, means for making predetermined reductions in train line pressure, an auxiliary reservoir, a brake cylinder, a triple valve operated by reductions in train line pressure to cause passage of air from the auxiliary reservoir to the brake cylinder to create a normal pressure therein bearing a definite ratio to the train line reduction made, means controlling passage of air from the train line to the brake cylinder to maintain such predetermined pressure proportionate to the train line reduction made, and means operable when the train line pressure is in excess of normal for admitting air in excess of such predetermined amount to the brake cylinder from the train line.

12. In an air brake system, a train pipe, means for creating excess pressure in the train line to predetermined degrees, means for making predetermined reductions in train line pressure, an auxiliary reservoir, a brake cylinder, a triple valve operated by reductions in train line pressure to cause passage of air from the auxiliary reservoir to the brake cylinder to create a normal pressure therein bearing a definite ratio to the train line reduction made, means controlling passage of air from the train line to the brake cylinder to maintain such predetermined pressure proportionate to the train line reduction made, and means operable when the train line pressure is in excess of normal for admitting air in excess of such predetermined amount to the brake cylinder from the train line, said latter means coöperating with the former means so that the excess brake cylinder pressure is maintained at a predetermined point.

13. In an air brake system, a train pipe, means for creating excess pressure in the train line to predetermined degrees, means for making predetermined reductions in train line pressure, an auxiliary reservoir, a brake cylinder, a triple valve operated by reductions in train line pressure to cause passage of air from the auxiliary reservoir to the brake cylinder to create a normal pressure therein bearing a definite ratio to the train line reduction made, means controlling passage of air from the train line to the brake cylinder to maintain such predetermined pressure proportionate to the train line reduction made, means operable when the train line pressure is in excess of normal for admitting air in excess of such predetermined amount to the brake cylinder from the train line, said latter means coöperating with the former means so that the excess brake cylinder pressure is maintained at a predetermined point, and means for cutting out the first mentioned means.

In testimony whereof I affix my signature in presence of two witnesses.

WILLIS C. WEBSTER. [L. S.]

Witnesses:
J. K. MOORE,
FREDERIC B. WRIGHT.

Copies of this patent may be obtained for five cents each, by addressing the "Commissioner of Patents, Washington, D. C."